US006489009B2

(12) United States Patent
Sasaki et al.

(10) Patent No.: US 6,489,009 B2
(45) Date of Patent: Dec. 3, 2002

(54) RECORDING SHEET PACKAGE, CORRECTION INFORMATION SHEET FOR THE SAME, AND THERMAL PRINTER FOR USE THEREWITH

(75) Inventors: Hidemi Sasaki, Saitama (JP); Yoshio Ishizuka, Kanagawa (JP); Takeshi Fujishiro, Saitama (JP); Fuyuki Inui, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/901,053

(22) Filed: Jul. 10, 2001

(65) Prior Publication Data

US 2001/0038904 A1 Nov. 8, 2001

Related U.S. Application Data

(62) Division of application No. 09/255,718, filed on Feb. 23, 1999, now Pat. No. 6,395,377.

(30) Foreign Application Priority Data

Mar. 10, 1998 (JP) ............................................ 10-58198
Mar. 20, 1998 (JP) ............................................ 10-72458
Dec. 2, 1998 (JP) ............................................ 10-343411

(51) Int. Cl.$^7$ ............................ B32B 27/14; B32B 3/00
(52) U.S. Cl. ........................ 428/195; 428/212; 428/913
(58) Field of Search ................................ 428/195, 212, 428/913

(56) References Cited

U.S. PATENT DOCUMENTS 4,646,066 A 2/1987 Baughman et al. ......... 340/540
4,736,089 A 4/1988 Hair et al. .................. 219/216
4,860,143 A 8/1989 Van Blerk .................. 360/133
6,395,377 B1 * 5/2002 Sasaki et al. ............... 428/195

FOREIGN PATENT DOCUMENTS

JP 5-116774 5/1993 ............ B65H/1/26

OTHER PUBLICATIONS

Derwent 112542, M. H. Everett, Apr. 5, 1988.

* cited by examiner

*Primary Examiner*—Bruce H. Hess
*Assistant Examiner*—B. Shewareged
(74) *Attorney, Agent, or Firm*—Sughrue Mion, PLLC

(57) ABSTRACT

A recording sheet package includes a stack of plural recording sheets. A packaging body contains the recording sheets. The packaging body or the recording sheets include humidity and temperature indicators which allows the degradation of the recording sheets to be compensated for in the course of thermal printing. A detection cutout is formed in the packaging body, for receiving insertion of a sheet remainder counter. The sheet remainder counter is allowed to push the recording sheets in a thickness direction thereof. The sheet remainder counter is adapted to detect a number of remaining ones of the recording sheets in the packaging body.

9 Claims, 22 Drawing Sheets

RECORDING SHEET PACKAGE, CORRECTION INFORMATION SHEET FOR THE SAME, AND THERMAL PRINTER FOR USE THEREWITH

This is a Divisional of application Ser. No. 09/255,718 filed Feb. 23, 1999, issued as U.S. Pat. No. 6,395,377, the disclosure of which is incorporated herein by reference in its entirety.

BACKGROUND OF THE INVENTION

1. Field of the Invention

The present invention relates to a recording sheet package, a correction information sheet for the same, and a thermal printer for use therewith. More particularly, the present invention relates to a recording sheet package in which the number of remaining recording sheets can be recognized easily, a correction information sheet for the same, and a thermal printer for use therewith.

2. Description Related to the Prior Art

There are two types of thermal printers, including a direct thermal printing type and a thermal transfer type, for each of which a recording sheet of a predetermined type is used. The recording sheet for the direct thermal printing is constituted by a support and three thermosensitive coloring layers overlaid thereon, which are cyan, magenta and yellow coloring layers. Heat energy of three values is applied to the recording sheet to develop colors of each of the coloring layers. Each coloring layer after being heated is optically fixed prior to thermal recording of a succeeding one of the coloring layers. For this optical fixation, ultraviolet rays of a predetermined range of the wavelength are applied to the recording sheet to destroy the coloring ability of each coloring layer. The succeeding coloring layer can be safely heated without influencing the density of the color developed in the preceding coloring layer. If the recording sheet of the direct thermal printing type is kept where it is subjected to light from lamps of widely used appliances, the coloring ability of the recording sheet is remarkably influenced. Consequently a stack of recording sheets is contained in a light-tight packaging bag, and furthermore, contained in a cardboard box to be shipped commercially.

There are two types of thermal transfer printers, including a wax-transfer type and a sublimation type. The wax-transfer printer melts or softens ink of ink film, and transfers it to the recording sheet. The sublimation printer sublimates or disperses dye of ink film on to the recording sheet. The recording sheet for the wax-transfer printer consists of coat paper having high smoothness. The recording sheet for the sublimation printer consists of paper coated with polyester resin. For both of the thermal transfer printers, a plurality of recording sheets are stacked and contained in a moisture proof bag, which is then contained in a cardboard box to be shipped for sale.

A recording sheet package is used for easy handling of a stack of the recording sheets. To load the printer with the recording sheets, at first, a packaging bag is opened to remove the recording sheet package, which is inserted in a sheet supply cassette. The sheet supply cassette is set in the printer. So the loading of the recording sheets is complicated to most of the users. While a user manually removes the recording sheets from the packaging bag, it is likely that the recording sheets are exposed to ambient light and touched by the user's hand. In the case of the recording sheets for the thermal transfer printing, touched portions are discolored by fingerprints. In the case of the recording sheets for the direct thermal printing, the coloring ability of the uppermost one of the recording sheets is influenced by the ambient light.

JP-A 5-116774 discloses the recording sheet package in which the recording sheets are not touched directly by user's hand, and with which the printer can be easily loaded with the recording sheets. A cutting line with a train of perforations is formed in a body of the recording sheet package. A portion of the body of the recording sheet package is cut away by tearing the cutting line, to form an opening for removal of the recording sheets. The tearing requires a user's manual operation prior to the loading into the printer.

Thermosensitive recording sheet characteristically has a problem in changes in the coloring ability, as the coloring ability is influenced by temperature, humidity, and other various conditions in the preservation of the recording sheet. If a recording sheet has been kept long in a harmful environment, there occurs failure in printing due to a change in the coloring ability. The recording sheet is wasted after the printing failure.

Another problem lies in difficulties in recognizing the remainder of the recording sheets. The recording sheet package must be removed from the printer before the remainder can be observed through a supply opening of the package. Such a complicated operation has been required for checking the remainder.

SUMMARY OF THE INVENTION

In view of the foregoing problems, an object of the present invention is to provide a recording sheet package with which the number of remaining recording sheets can be recognized easily, a correction information sheet for the same, and a thermal printer for use therewith.

Another object of the present invention is to provide a recording sheet package with which environmental influences to image recording with a recording sheet can be eliminated, a correction information sheet for the same, and a thermal printer for use therewith.

A further object of the present invention is to provide a recording sheet package with which degradation of recording sheets with time can be compensated for in the course of image recording, a correction information sheet for the same, and a thermal printer for use therewith.

Still another object of the present invention is to provide a recording sheet package with which harmful conditions of preserving recording sheets can be compensated for in the course of image recording, a correction information sheet for the same, and a thermal printer for use therewith.

In order to achieve the above and other objects and advantages of this invention, a recording sheet package includes a stack of plural recording sheets. A packaging body contains the recording sheets. A detection cutout is formed in the packaging body, for receiving insertion of a sheet remainder counter, so as to allow the sheet remainder counter to push the recording sheets in a thickness direction thereof, the sheet remainder counter being adapted to detect a number of remaining ones of the recording sheets in the packaging body.

By this construction, the number of remaining recording sheets can be recognized easily, because the detection cutout enables the remaining sheets to be counted readily.

In a preferred embodiment, the detection cutout is formed in a top plate portion of the packaging body opposed to the recording sheets, and the sheet remainder counter is moved in the thickness direction when inserted in the detection cutout.

Furthermore, a protective sheet is disposed between a lowest one of the recording sheets and a bottom plate portion of the packaging body opposed to the recording sheets, for protecting the recording sheets. An auxiliary cutout is formed in the protective sheet, disposed under the detection cutout, and greater than the detection cutout.

In the sheet remainder counter, (A) a pusher is inserted in the detection cutout, for pushing the recording sheets in a thickness direction. (B) At least one train of graduation indicia is arranged substantially in parallel with a path of shifting of the pusher, and disposed at an interval determined in consideration of a thickness of the recording sheets. (C) A pointer is disposed in a predetermined position on the pusher, for pointing one position in the at least one train of the graduation indicia, to indicate a number of remaining ones of the recording sheets inside the packaging body.

In another aspect of the present invention, a correction information sheet is used with a recording material package. The correction information sheet includes a temperature indicator portion for detecting a present temperature, and for visibly indicating a selected one of at least first and second predetermined temperature ranges within which the present temperature is. At least first and second sets of correction information are predetermined in accordance with states of the recording material conditioned by respectively the first and second temperature ranges, indicated externally, and designated selectively in accordance with the first or second temperature range associated with the present temperature.

By this construction, environmental influences to image recording with a recording material can be eliminated, because a difference between a safely used temperature of the recording material and too high or low temperature is compensated for by correcting the recording density.

In a preferred embodiment, the temperature indicator portion includes at least first and second regions arranged in sequence, and any one of the at least first and second regions associated with the present temperature changes in a color, for designating first or second temperature range.

The recording material is thermosensitive recording material colorable in response to recording heat energy applied thereto, and the correction information is adapted to correct the recording heat energy.

In still another aspect of the present invention, a correction information sheet includes a humidity indicator portion for detecting a present humidity, and for visibly indicating a selected one of at least first and second predetermined humidity ranges within which the present humidity is. At least first and second sets of correction information, predetermined in accordance with states of the recording material conditioned by respectively the first and second humidity ranges, indicated externally, and designated selectively in accordance with the first or second humidity range associated with the present humidity.

By this construction, environmental influences to image recording with a recording material can be eliminated, because a difference between a safely used humidity of the recording material and too high or low humidity is compensated for by correcting the recording density.

In another aspect of the present invention, a recording material package includes a recording material. A packaging body contains the recording material. A sample recording sheet is constituted in a manner of the recording material, and disposed outside the packaging body. Plural sets of color sample information are indicated with the sample recording sheet, for representing colors of the recording material changed with time. Plural sets of correction information are indicated in association with respectively the sets of the color sample information, wherein when the sample recording sheet is in a state of a selected one of the sets of the color sample information, one of the sets of the correction information is designated in association with the selected set of the color sample information.

By this construction, degradation of the recording material with time can be compensated for in the course of image recording, because the sets of the color sample information can be used to estimate the degree of degradation of the recording material.

In an additional aspect of the present invention, a recording material package includes a recording material, having a recording area adapted to image recording. A packaging body contains the recording material. At least one temperature indicator portion and/or at least one humidity indicator portion is disposed on the packaging body or a portion of the recording material different from the recording area, the temperature indicator portion having low density before a reach of temperature to a predetermined temperature level, and developing high density irreversibly in response to the reach of the temperature to the predetermined temperature level, and the humidity indicator portion having low density before a reach of humidity to a predetermined humidity level, and developing high density irreversibly in response to the reach of the humidity to the predetermined humidity level.

By this construction, harmful conditions of preserving recording material can be compensated for in the course of image recording, because excessively high or low temperature or humidity to which the recording material has been subjected can be recognized for the image recording.

In a preferred embodiment, the temperature indicator portion has the low density before a rise of the temperature to the predetermined temperature level, and develops the high density irreversibly in response to the rise of the temperature to the predetermined temperature level, and the humidity indicator portion has the low density before a drop of the humidity to the predetermined humidity level, and develops the high density irreversibly in response to the drop of the humidity to the predetermined humidity level.

The recording material has a recording surface and a back surface reverse thereto, and the temperature indicator portion and the humidity indicator portion are disposed on the back surface.

Furthermore expiration date information is indicated on the packaging body or a portion of the recording material different from the recording area, for representing an expiration date of the recording material.

In a thermal printer, (A) an information reader reads the temperature indicator portion and/or the humidity indicator portion. (B) A printing controller corrects recording heat energy for image recording by use of correction information according to the temperature indicator portion and/or the humidity indicator portion, the correction information being predetermined in accordance with a state of the recording sheets conditioned by the predetermined temperature level and/or the predetermined humidity level, the recording heat energy being applied to each of the recording sheets after being corrected.

In a further aspect of the present invention, a recording sheet package includes a stack of N recording sheets. A packaging body contains the recording sheets. An indicator window is formed in a top plate portion of the packaging body in a predetermined position, and adapted to observe an uppermost one of the N recording sheets therethrough.

Number information of 1–N, indicated on a respective top surface of the N recording sheets and inside the indicator window, associated with the N recording sheets in an upwards increasing sequence, for representing a remainder of the N recording sheets in the packaging body.

By this construction, the number of remaining recording sheets can be recognized easily, because the indicator window and the number information of 1–N are very simply structured.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
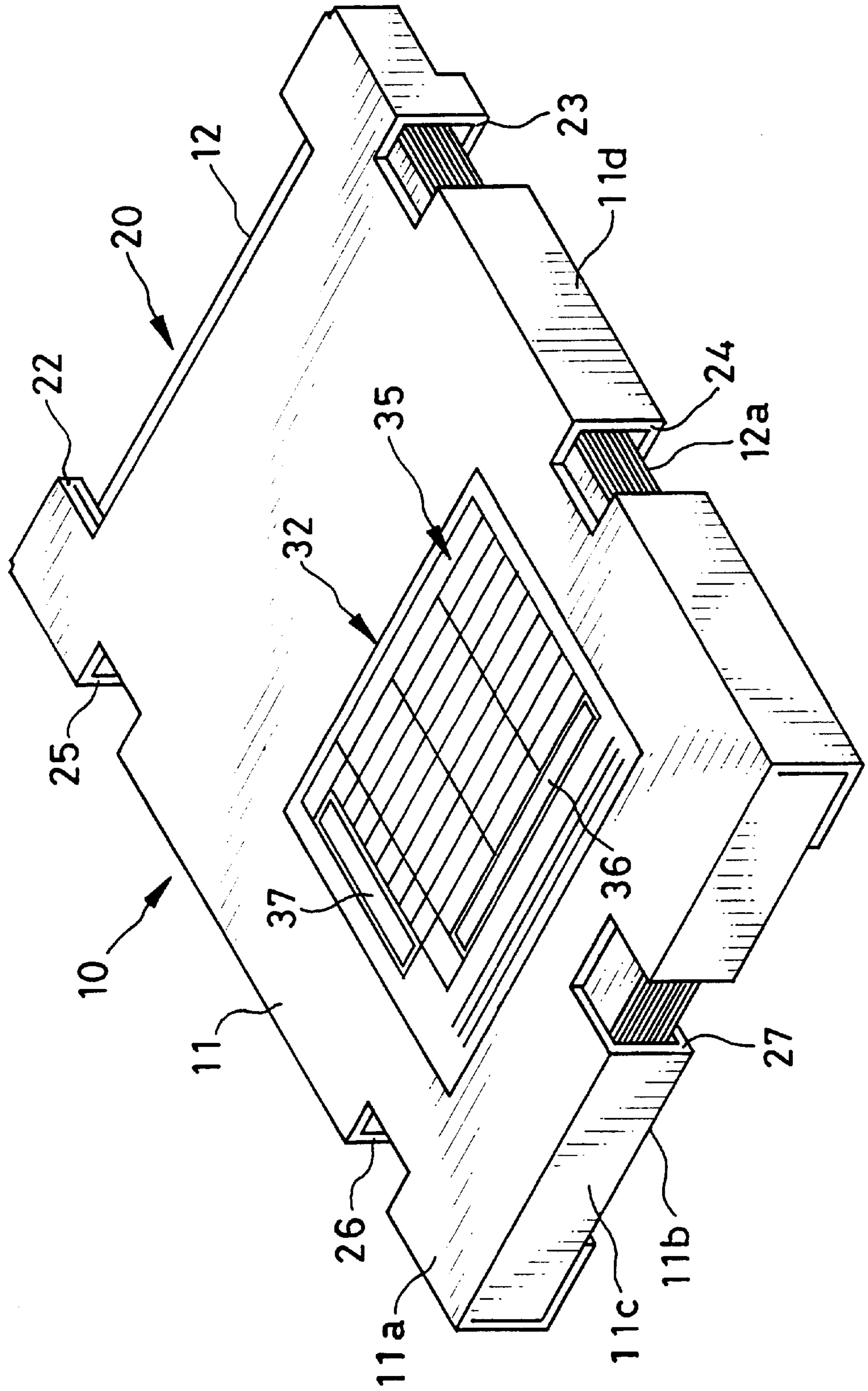
FIG. 1 is a perspective illustrating a recording sheet package.
Figure 2:
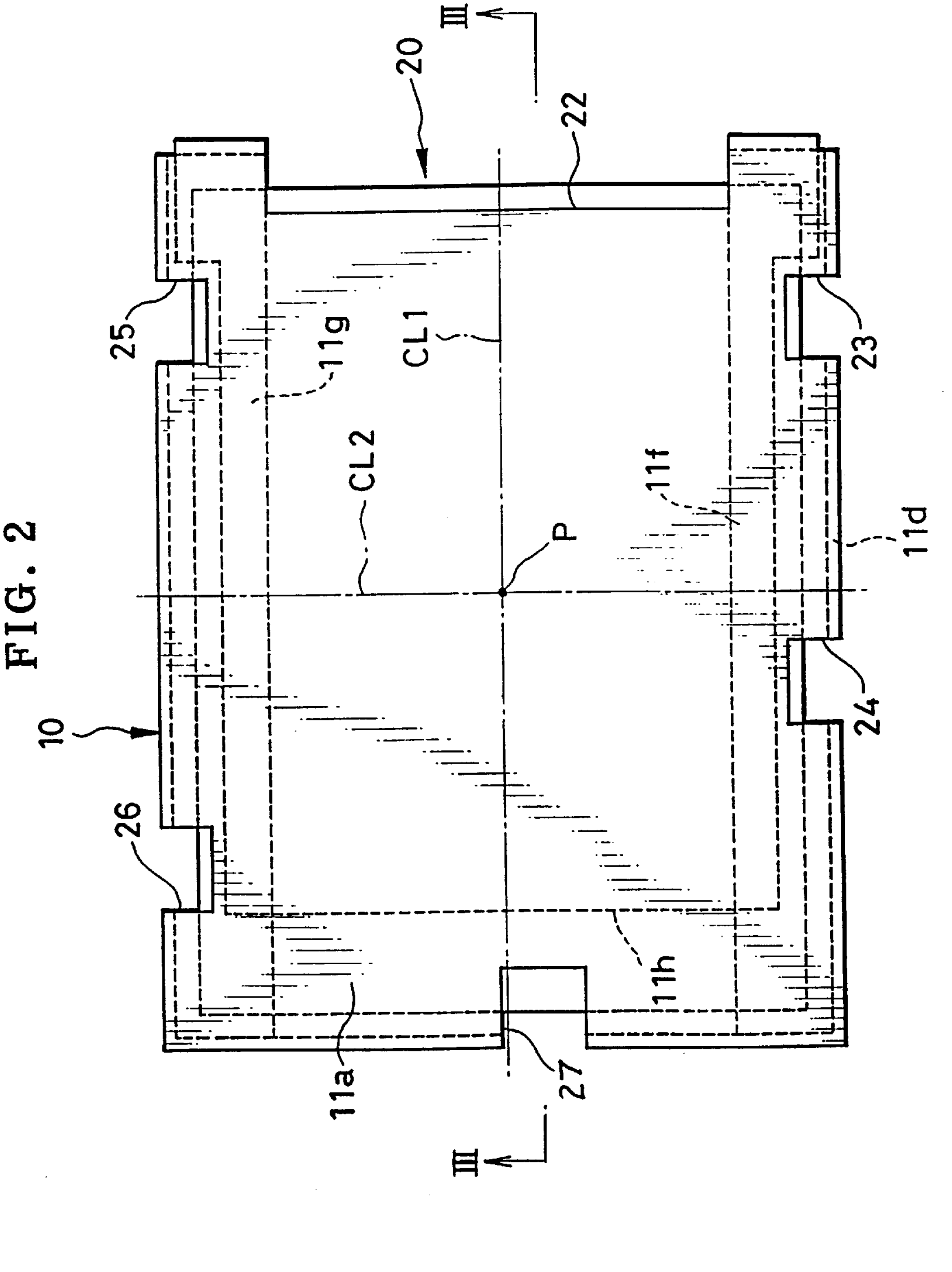
FIG. 2 is a top plan illustrating the recording sheet package.

In FIGS. 1 and 2, a recording sheet package 10 has a packaging body 11, which is in a thin box shape, and produced from dust proof paper or cardboard with a great thickness and made of long fiber. The use of this type of paper is effective in avoiding creation of dust of paper in the course of cutting the paper or supply of a recording sheet. The printing is not influenced by the use of the packaging body 11 of the paper. Note that it is possible to constitute the packaging body 11 by use of a board of paper instead of the dust proof paper. Also plastics may be used to form the packaging body 11.

Figure 3:
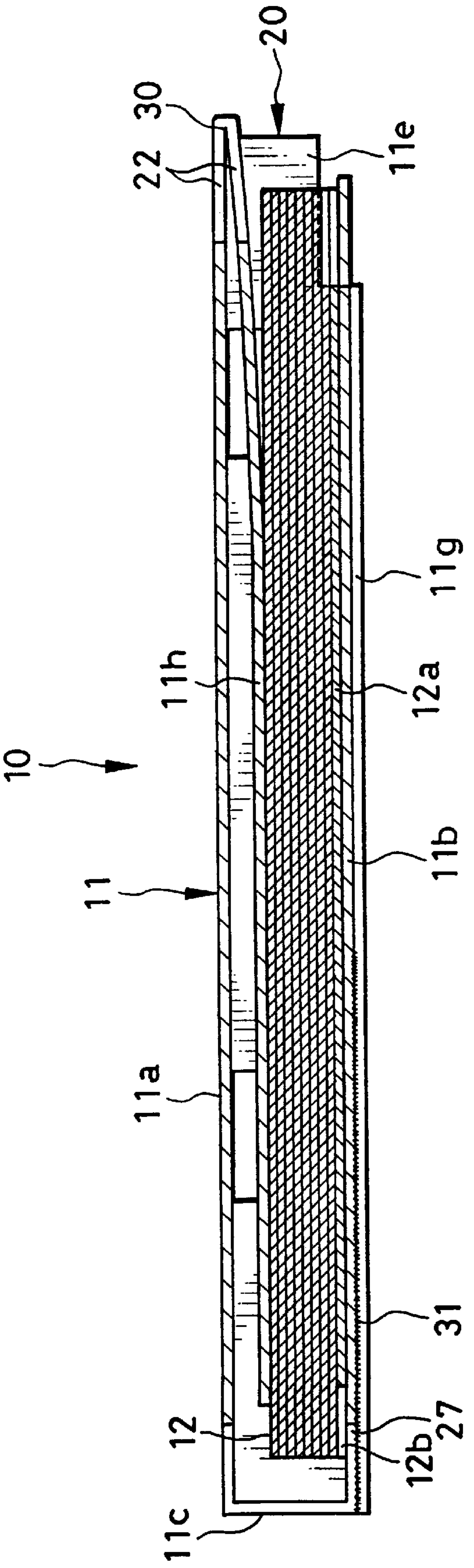
FIG. 3 is a vertical section illustrating the recording sheet package.

In FIG. 3, a stack of thermosensitive recording sheets 12 of a direct thermal printing type is contained in the packaging body 11. The recording sheets 12 are contained in the packaging body 11 by directing their recording surface downwards and their back surface upwards. If the recording sheets 12 are thermal printing stickers having an adhesive layer, the recording sheets 12 have a greater thickness so that a stack of only ten (10) recording sheets 12 is contained in the packaging body 11. Of course the number of the recording sheets 12 to be contained can be changed suitably in consideration of the thickness of the recording sheets 12. A protective sheet 12*a* is additionally disposed under the lowest one of the recording sheets 12. The protective sheet 12*a* tightly contacts the recording surface of the lowest one of the recording sheets 12, and shields the recording surface from moisture and ambient light. Note that it is possible to omit the protective sheet 12*a*.

Figure 4:
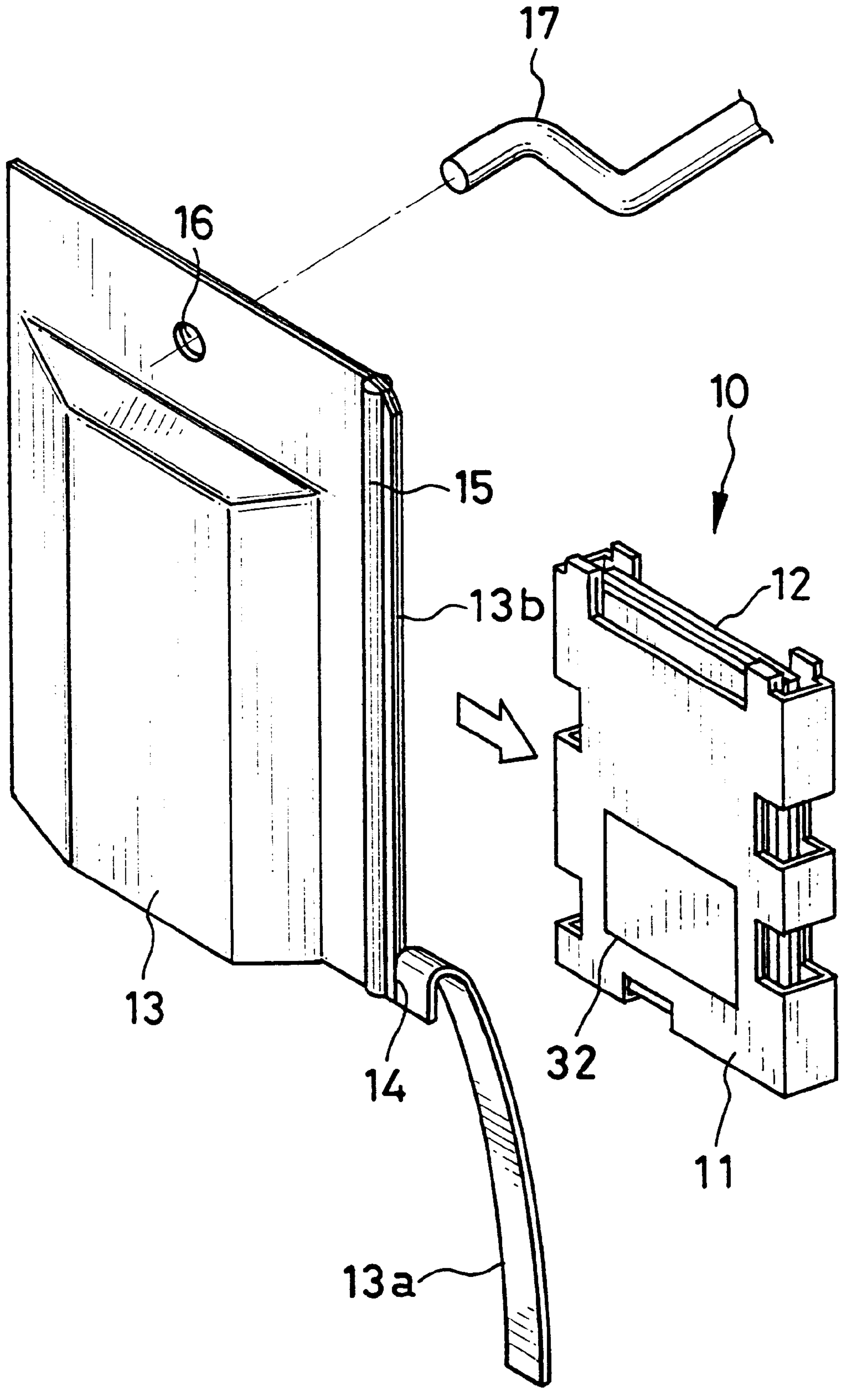
FIG. 4 is a perspective illustrating a state of removal of the recording sheet package from an outer packaging bag.

In FIG. 4, the recording sheet package 10 is contained in an outer packaging bag 13 having light-shielding and moisture proof characteristics. A hole 16 is formed in the top end of the outer packaging bag 13, for insertion of a suspension hook 17. When the recording sheet package 10 is displayed for retail sale, the outer packaging bag 13 with the recording sheet package 10 is suspended.

To use the recording sheets 12, a cut margin 13*a* of the outer packaging bag 13 is cut away along a cut line 14. A fastener 15 of synthetic resin is disposed in the vicinity of an open edge 13*b* of the outer packaging bag 13. The fastener 15 is well-known in the art, and consists of a combination of a groove-formed ridge and a ridge fitted therein. The outer packaging bag 13 is used again by opening and closing the fastener 15. If the recording sheet package 10 or the like is re-contained in the outer packaging bag 13 before the finish of being used, the fastener 15 is closed to enclose the recording sheet package 10.

Figure 5:
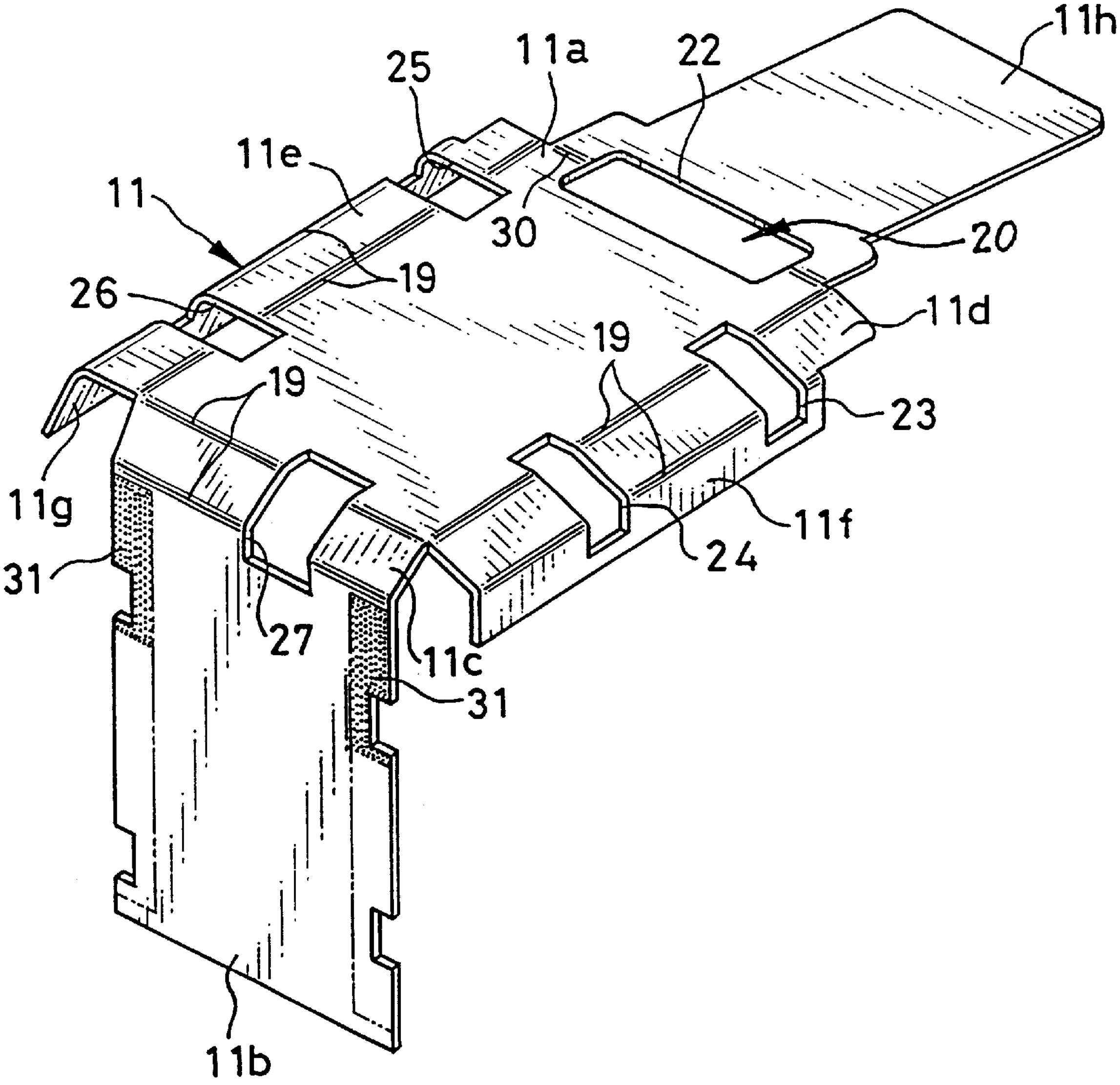
FIG. 5 is a perspective illustrating a spread state of the packaging body.

In FIGS. 1, 2 and 5, the packaging body 11 is constituted of one top plate 11*a*, one bottom plate 11*b*, one end plate 11*c* and two lateral plates 11*d* and 11*e*. The top and bottom plates 11*a* and 11*b* are rectangular and slightly larger than the recording sheets 12. The combination of the plates 11*a*–11*e* is bent by use of bend lines 19 in an erect manner to constitute the packaging body 11 in the thin box shape.

In FIG. 3, a supply opening 20 is formed in the packaging body 11 to lie in a shorter side line of the packaging body 11. A roller receiving recess 22 is formed in the packaging body 11 along an edge between the top plate 11*a* and a push plate 11*h* (See FIG. 5), communicates with the supply opening 20, and receives a supply roller 21 (See FIG. 10) of the thermal printer. The roller receiving recess 22 is defined by forming an opening in a spread sheet from which the packaging body 11 has been produced.

Loading engaging cutouts 23–26 and a detection cutout 27 are formed in the lateral plates 11*d* and 11*e* and the end plate 11*c*. The cutouts 23–27 are defined by partially cutting the top and bottom plates 11*a* and 11*b* in addition to cutting of the lateral plates 11*d* and 11*e* and the end plate 11*c*.

Among the cutouts 23–27 in FIG. 2, the loading engaging cutouts 24, 26 and 27 are formed in positions asymmetric with respect to a reference line CL1, which is directed in a supply direction of the recording sheets 12 and passes the center P of the packaging body 11. The loading engaging cutouts 23 and 24 are formed in positions asymmetric with respect to a reference line CL2, which is perpendicular to the supply direction of the recording sheets 12 and passes the center P of the packaging body 11.

In FIG. 5, a spread state of the packaging body 11 is illustrated. The lateral plates 11*d* and 11*e* are arranged connectively with the top plate 11*a* via the bend lines 19. Fixing plates 11*f* and 11*g* are arranged connectively with the lateral plates 11*d* and 11*e* via the bend lines 19. The end plate 11*c* communicates with a shorter side line of the top plate 11*a* opposite to the supply opening 20. Also the end plate 11*c* communicates with the bottom plate 11*b*. The push plate 11*h* communicates with a shorter side line of the top plate 11*a* at the supply opening 20 via a bend line 30.

An adhesive layer 31 is formed by applying adhesive agent to regions of the securing plates 11*f* and 11*g* in contact with the bottom plate 11*b* in the vicinity of the end opposite to the supply opening 20. The adhesive layer 31 keeps the packaging body 11 shaped like a box. The regions with the adhesive layer 31 are not the entire surface of the securing plates 11*f* and 11*g*. A length of those regions of the adhesive layer 31 is at least ⅓ as great as a length of the longer side line of the packaging body 11, and at most ½ as great as the same. The remainder of the securing plates 11*f* and 11*g* is not attached but free from the remaining portion of the bottom plate 11*b*, which operates like a movable flap.

In FIG. 3, the push plate 11*h* is bent at an angle of approximately 150 degrees via the bend line 30 to lie under the top plate 11*a*. The push plate 11*h* presses the recording sheets 12 against the bottom plate 11*b*, so as to keep the recording sheets 12 in tight contact with one another. No gap will be created between each two of the recording sheets 12. This is effective in protecting the recording surfaces from being influenced by moisture or ambient light, as the moisture and the light are shielded.

Figure 6:
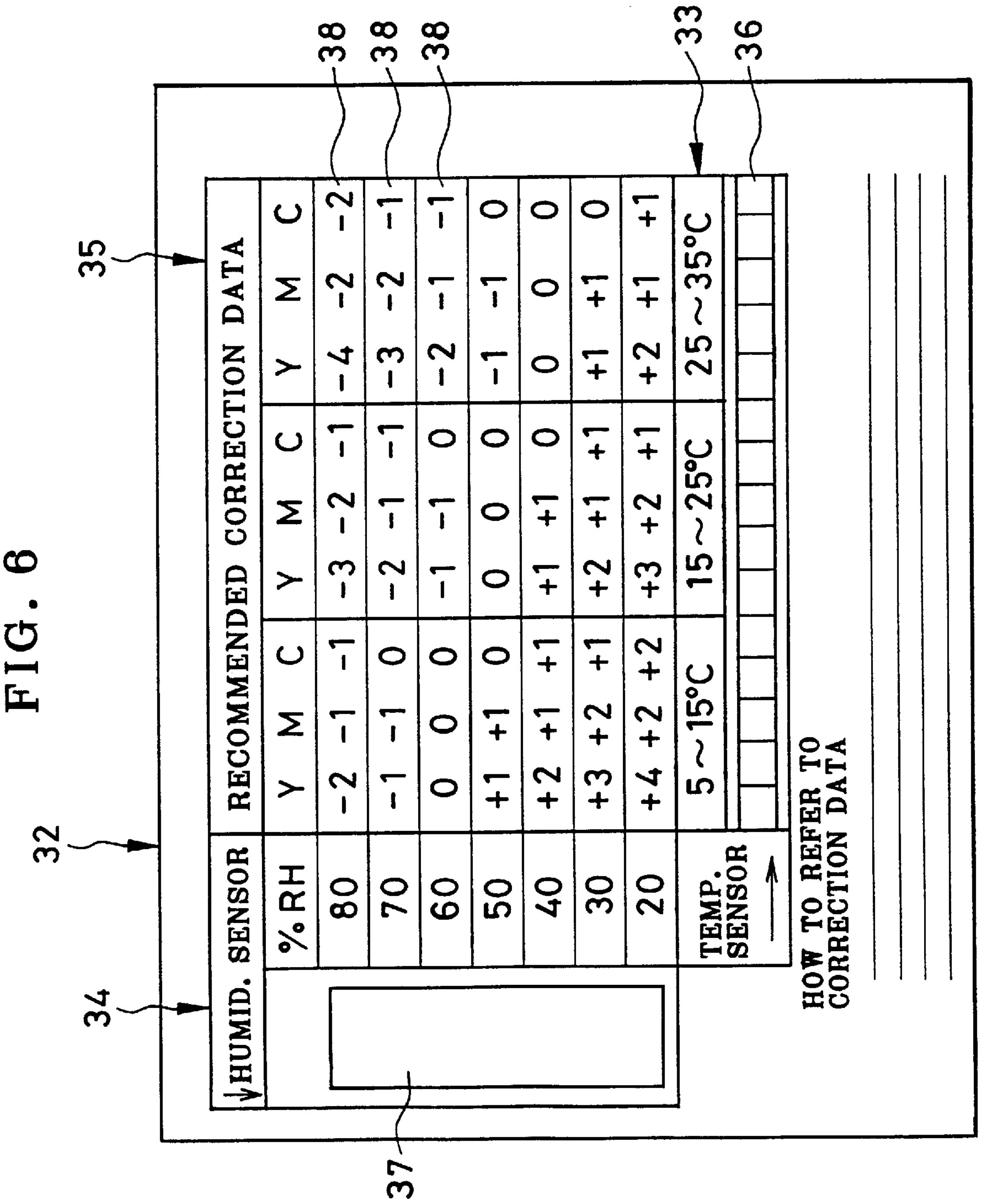
FIG. 6 is an explanatory view in plan, illustrating a correction information sheet for the recording sheet package.

In FIG. 1, a correction information sheet or card 32 is attached to the outside of the top plate 11*a*. In FIG. 6, the correction information sheet 32 is provided with a temperature table 33, a humidity table 34 and a correction information table 35. The temperature table 33 has a temperature indicator portion 36. The temperature indicator portion 36 consists of cholesteric liquid crystal, which is changed in the color upon a change in the temperature by a predetermined difference. When the temperature changes by 2 degrees centigrade, the temperature indicator portion 36 changes in the color, to indicate the temperature as detected.

The humidity table 34 has a humidity indicator portion 37, which changes in the color upon a change in the humidity by a predetermined difference. When the humidity changes by a regular value of 10%RH, the humidity indicator portion 37 changes in the color, to indicate the humidity as detected within a detectable tolerable range of 20–80%RH. As is known in the art of humidity indicator, the humidity indicator portion 37 changes from the gray color to the pink color. The temperature indicator portion 36 and the humidity indicator portion 37 are those known to those skilled in the art, and are not further described herein.

The correction information table 35 is constituted by plural sets of correction information 38 recommended in correspondence with changes in the temperature and humidity. The correction information 38 is predetermined to compensate for an excess or loss in the density of each recording sheet under certain conditions of the temperature and humidity with reference to the density of each recording sheet kept under ideal temperature and humidity. The correction information 38 is predetermined experimentally for each of printer types. In the present embodiment, there are three temperature ranges of 5–15, 15–25 and 25–35° C., and seven humidity ranges of 10–20, 20–30, 30–40, 40–50, 50–60, 60–70, 70–80 and 80–90%RH. Twenty-one sets of the correction information 38 are obtained. The ranges in the temperature table 33 are arranged horizontally, and the ranges in the humidity table 34 are arranged vertically, so as to define squares arranged in a matrix. The sets of the correction information 38 are prerecorded in the squares for each combination of a temperature range and a humidity range.

It is therefore possible to correct the density in consideration of preserving the recording sheets 12 even under certain unusual conditions by use of the correction information 38 referred to with a combination of a temperature and a humidity. It is to be noted that the ranges of the temperature and the humidity can be determined differently from the above. Forms of the correction information may be changed for each of various types of the thermal printers. Furthermore the correction information may be as simple as a combination of a negative or positive sign and a degree of correction.

Figure 7:
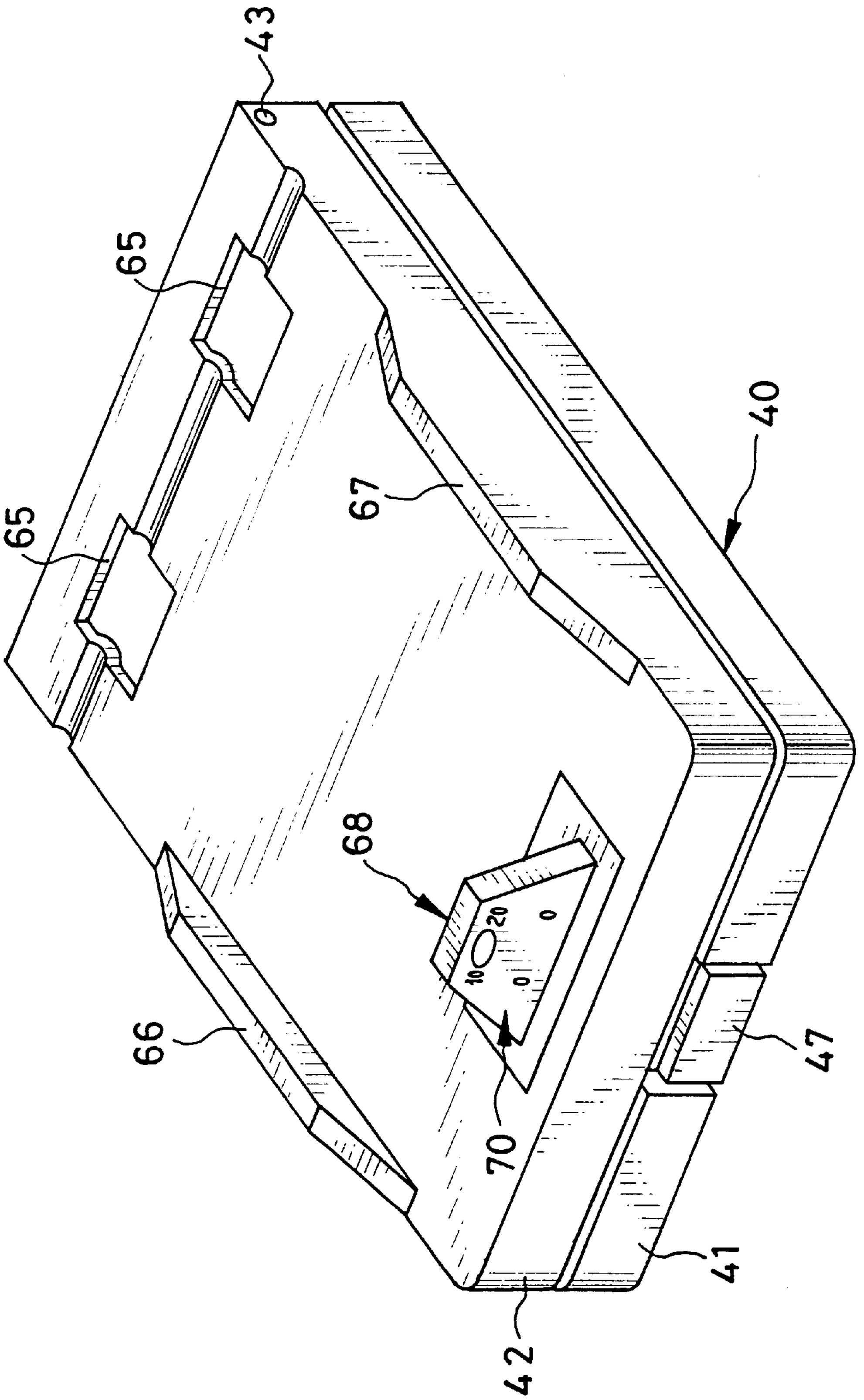
FIG. 7 is a perspective illustrating a sheet supply cassette.
Figure 8:
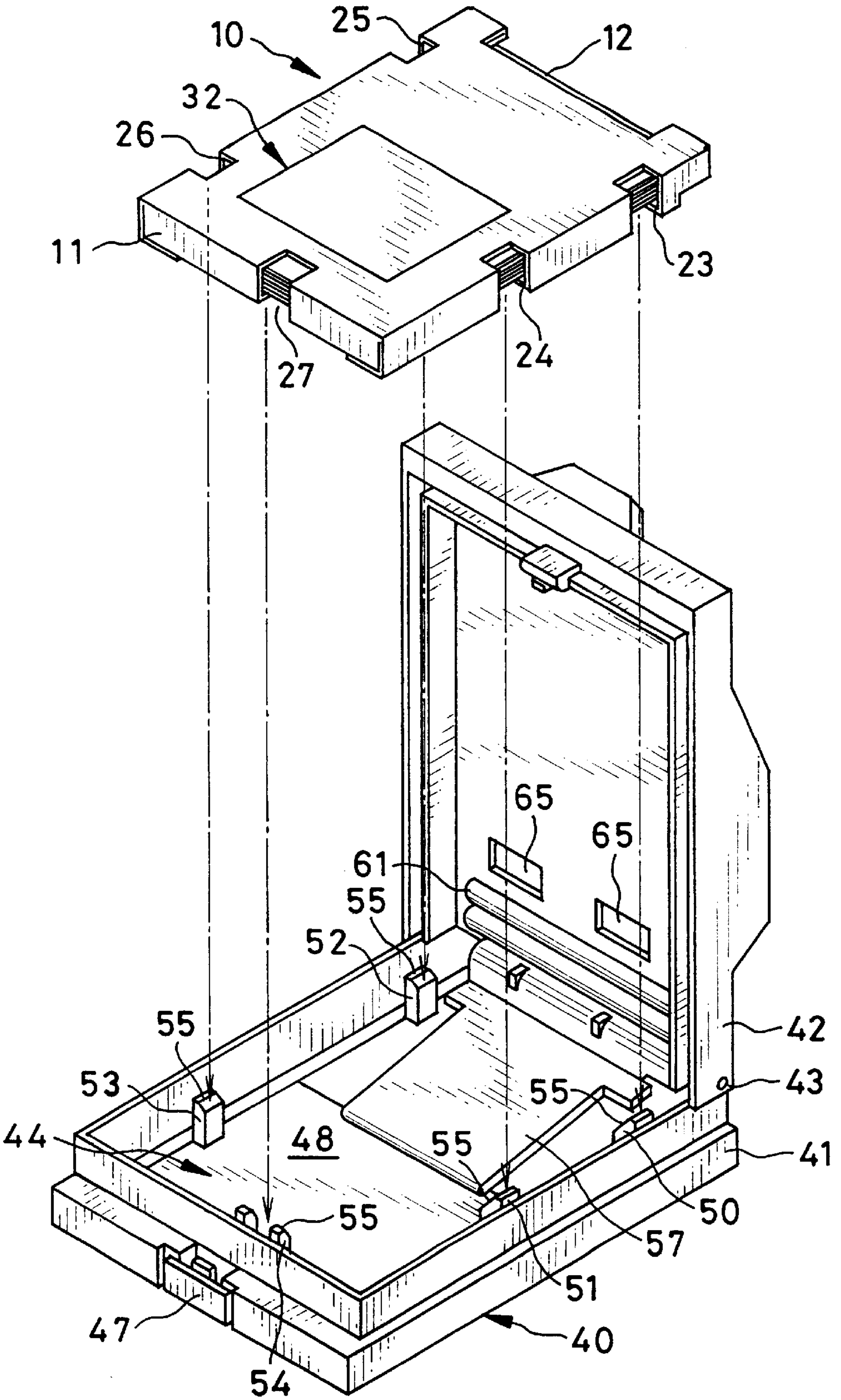
FIG. 8 is a perspective illustrating an open state of the sheet supply cassette with the recording sheet package.

In FIGS. 7 and 8, a sheet supply cassette 40 to contain the recording sheet package 10 is illustrated. The sheet supply cassette 40 is constituted by a cassette body 41 and a lid 42, and generally has a box shape.

Figure 9:
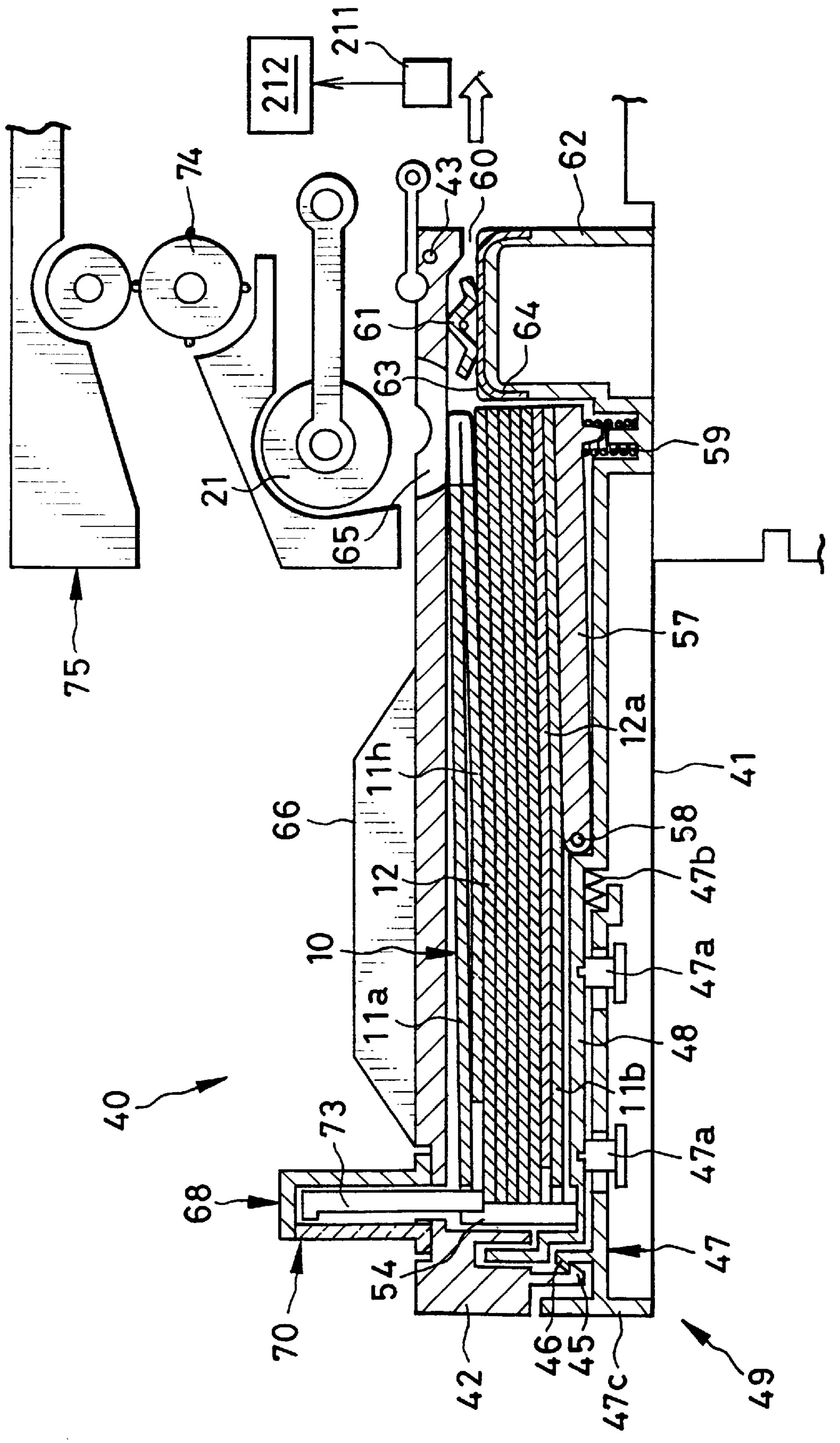
FIG. 9 is an explanatory view in section, illustrating the sheet supply cassette in a state inserted in a thermal printer.

The lid 42 is supported on the cassette body 41 in a rotatable manner about an axis defined by a pivot 43, and is openable within an angle range of approximately 90 degrees. In FIG. 8, an inner surface 44 of the cassette body 41 is loaded with the recording sheet package 10 while the lid 42 is kept open erectly. When the lid 42 is closed, retainer hooks 45 and 46 of a lock mechanism 49 in FIG. 9 are engaged with each other to keep the lid 42 closed.

The lock mechanism 49 is constituted by the retainer hook 45 on the lid 42 and a lock plate 47, which is kept slidable in the supply direction by support shafts 47*a* on a bottom plate 48. The lock plate 47 has the retainer hook 46, which is engaged with the retainer hook 45 of the lid 42. The lock plate 47 is biased by a coil spring 47*b* in a direction of engaging the retainer hooks 45 and 46. When the lid 42 is closed, the retainer hooks 45 and 46 of the lock mechanism 49 are retained on each other to keep the lid 42 closed. An operation plate 47*c* of the lock plate 47 is pushed to disengage the retainer hook 45 from the retainer hook 46, so that the lid 42 is rendered openable.

In FIG. 8, the inner surface 44 has a slightly greater area than the recording sheet package 10 so as to facilitate the loading operation. Loading guiding projections 50–54 are arranged on the bottom plate 48 of the cassette body 41 in positions of the cutouts 23–27. The loading guiding projections 50–54 respectively have a rectangular shape, and are provided with a guide surface 55 on the top. The guide surface 55 is inclined, and causes the loading guiding projections 50–54 smoothly to enter the cutouts 23–27.

When the recording sheet package 10 is set on the inner surface 44 in the correct position, the loading guiding projections 50–54 enter the cutouts 23–27 to allow loading the recording sheet package 10 on the inner surface 44. If the recording sheet package 10 is set on the inner surface 44 with a left lateral side of the recording sheet package 10 oriented to the right, or with its front edge oriented to the rear, then the loading guiding projections 50–54 are not opposed to the cutouts 23–27. The recording sheet package 10 cannot be inserted and can be found to be incorrectly set. A user is enabled to reinsert the recording sheet package 10 in the sheet supply cassette 40 by correcting the orientation of the recording sheet package 10.

Figure 11:
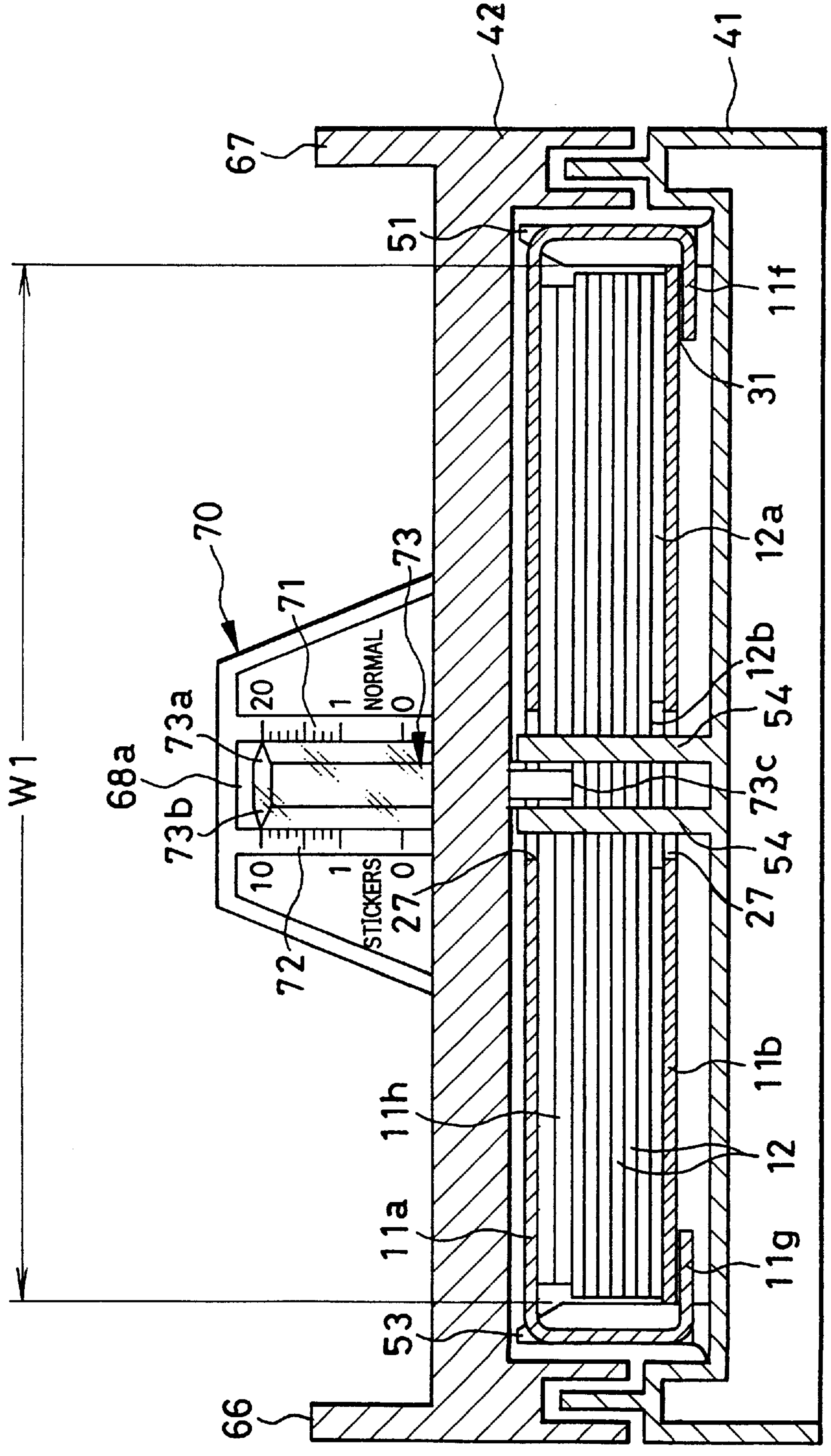
FIG. 11 is a cross section illustrating the sheet supply cassette containing the recording sheet package.

The loading guiding projections 50–53 are laterally disposed as two pairs. In FIG. 11, W1 is a distance from the level of the loading guiding projections 50 and 51 to the level of the loading guiding projections 52 and 53. The distance W1 is determined to be slightly greater than the width of the recording sheets. Thus the lateral sides of the recording sheets 12 are neatly set by entry of the loading guiding projections 50–53 into the packaging body 11 through the loading engaging cutouts 23–26. Also the recording sheets 12 are positioned in the direction crosswise to the supply direction of the recording sheets 12. The recording sheets 12 are prevented from being jammed or provided with an obliquely printed image, as the recording sheets 12 do not move obliquely.

In FIG. 9, the rear edges of the recording sheets 12 are arranged neatly by the loading guiding projection 54 which is located opposite to a sheet supply passageway 60. The loading guiding projection 54 also tightly positions the recording sheets 12 in the supply direction. If the recording sheets 12 are loosely contained in the packaging body 11, setting of the recording sheet package 10 in the sheet supply cassette 40 automatically tightens the recording sheets 12 in the supply direction.

A lifter plate 57 is disposed on the inner surface 44. In FIG. 9, the lifter plate 57 is supported on the bottom plate 48 rotatably about an axis defined by a pivot 58. The lifter plate 57 is biased upwards by a coil spring 59, to push up the bottom plate 11*b* of the recording sheet package 10.

A gap is formed between the cassette body 41 and the lid 42 in the vicinity of the pivot 43 while the lid 42 is closed. This gap constitutes the sheet supply passageway 60. A spring plate 61 is disposed in a path near to the sheet supply passageway 60 on the side of the lid 42. The spring plate 61 biases the recording sheets 12 toward a wall of the path on the side of the cassette body 41.

A recording sheet separator 62 is disposed to project in a supply path near to the sheet supply passageway 60 on the side of the cassette body 41. A cork member 63 is attached to the surface of the recording sheet separator 62. When two of the recording sheets 12 remain overlapped on one another while supplied, the cork member 63 frictionally stops the lower one of the two of the recording sheets 12 from advancing. Thus only the uppermost one of the recording sheets 12 is allowed to advance each time. Furthermore the recording sheet separator 62 has two separator projections 64 for avoiding double supply of the recording sheets 12. The separator projections 64 contact the lower one of the two of the recording sheets 12, to stop it from advancing.

Figure 10:
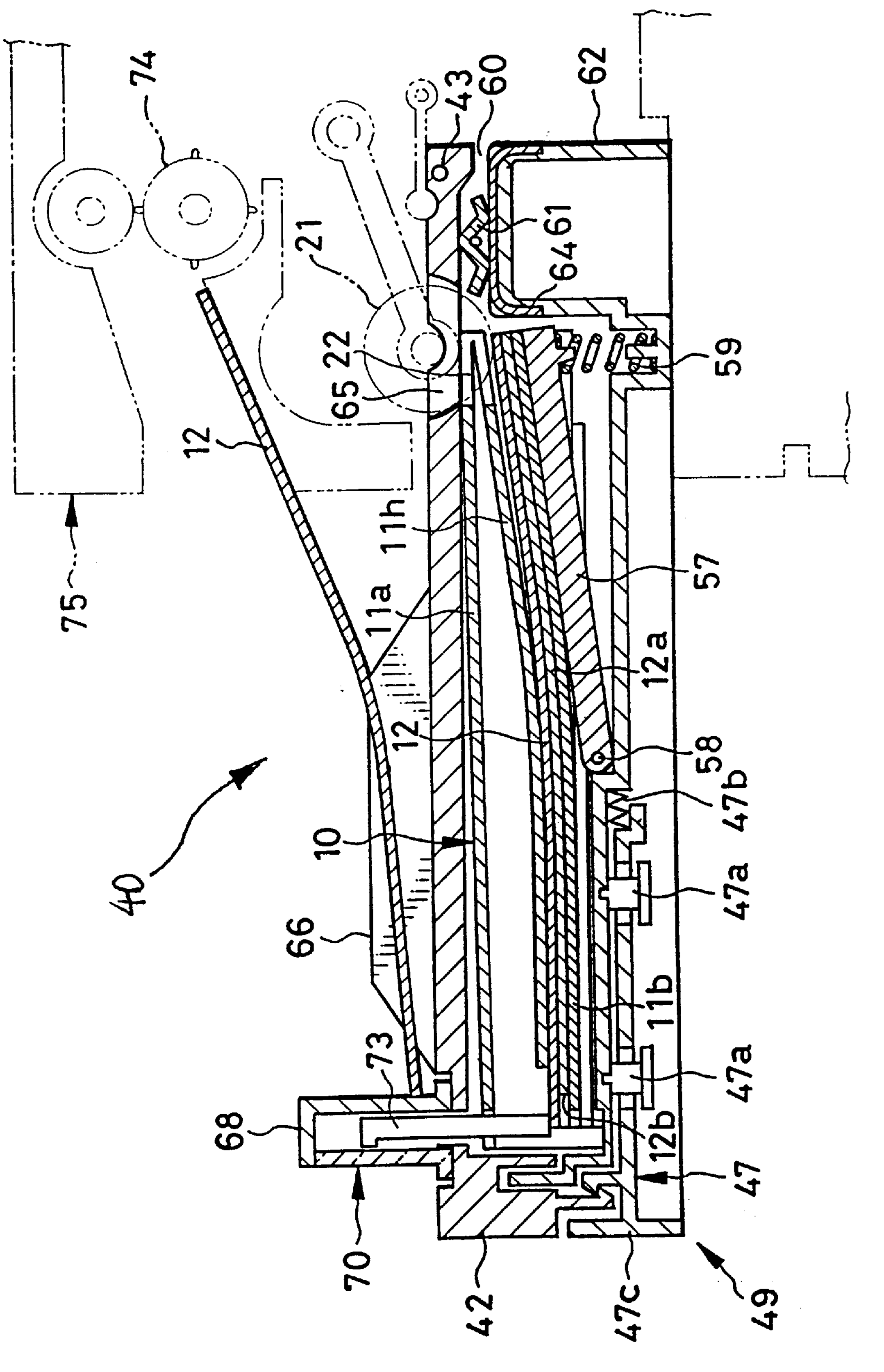
FIG. 10 is an explanatory view in section, illustrating the sheet supply cassette in a step of ejecting the recording sheet.

In FIG. 10, roller openings 65 are formed in the lid 42 in positions corresponding to the roller receiving recess 22 in the recording sheet package 10. In a thermal printer 75, the sheet supply cassette 40 is set, so as to cause portions of the supply roller 21 to enter the roller openings 65. The supply roller 21 contacts the uppermost one of the recording sheets 12 in the recording sheet package 10. The supply roller 21 rotates in the supply direction in the course of printing. Thus only the uppermost one of the recording sheets 12 is advanced from the recording sheet package 10 toward a printing stage in the thermal printer 75.

In FIGS. 7 and 10, a top face of the lid 42 consists of an ejection tray. Recording sheet guide members 66 and 67 and a stopper 68 are disposed on the lid 42. The recording sheet guide members 66 and 67 regulate lateral sides of an ejected one of the recording sheets 12, and lie along the longer side lines of the lid 42. The stopper 68 prevents the ejected one of the recording sheets 12 from dropping away from the lid 42 by contacting an advancing edge of the recording sheets 12.

A sheet remainder counter 70 is disposed on the stopper 68. In FIG. 11, the sheet remainder counter 70 is constituted by trains of graduation indicia 71 and 72 and a pusher 73. The number of the remaining ones of the recording sheets 12 is indicated by pointing of the pusher 73 at the trains of graduation indicia 71 and 72.

Triangular pointer ends 73*a* and 73*b* are disposed on the top of the pusher 73, and point the trains of graduation indicia 71 and 72. A transparent plate 68*a* is disposed in front of the pointer ends 73*a* and 73*b* to cover the pointer ends 73*a* and 73*b* in an externally visible manner. The transparent plate 68*a* consists of an ultraviolet cut filter. The transparent plate 68*a* avoids entry of fixing rays, which would influence the coloring ability of the recording sheets 12.

The pusher 73 is movable in the thickness direction of the recording sheets 12 inside the stopper 68. The weight of the pusher 73 causes a pusher end 73*c* of the pusher 73 to contact the uppermost one of the recording sheets 12 through the detection cutout 27.

Figure 12:
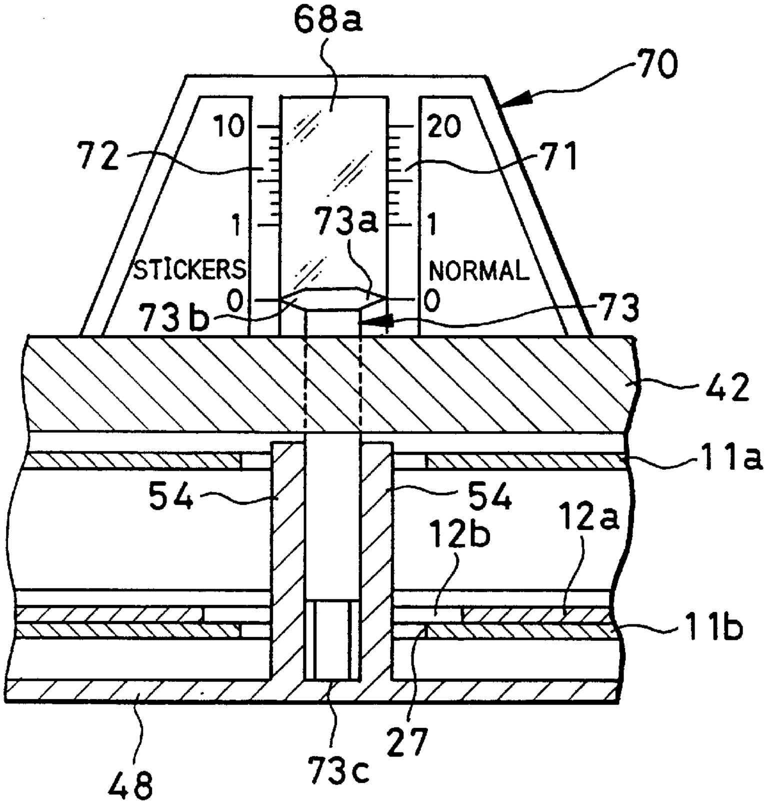
FIG. 12 is a cross section illustrating a sheet remainder counter of the sheet supply cassette with the recording sheet package.

In FIG. 12, the trains of graduation indicia 71 and 72 are disposed beside the pusher 73. The train of graduation indicia 71 are included in a scale for the recording sheets 12 of an ordinary type, and indicate from "20" down to "0" (zero). The train of graduation indicia 72 are included in a scale for thermal printing stickers having a greater thickness, and indicate from "10" down to "0" (zero).

In the present invention, the trains of graduation indicia 71 and 72 are provided with quantitative signs only to indicate "maximum" and "emptiness". For the middle levels, the trains of graduation indicia 71 and 72 indicate information only upon being pointed by the pointer ends 73*a* and 73*b*. Of course the unit interval of the graduation indicia 71 and 72 can be associated with one or two sheets, or any suitable predetermined number of sheets. Furthermore, portions for the middle levels in the trains of graduation indicia 71 and 72 may be blank.

An auxiliary cutout 12*b* is formed in the protective sheet 12*a* under the recording sheets 12. The auxiliary cutout 12*b* is in a position of the detection cutout 27 in the packaging body 11, but has a size greater than the detection cutout 27. When a final one of the recording sheets 12 is used, the pusher end 73*c* of the pusher 73 comes down to the bottom plate 48 of the sheet supply cassette 40. Accordingly there is a great difference between a state of FIG. 9 where some of the recording sheets 12 remains in the sheet supply cassette 40 and a state of FIGS. 12 and 13 where none of the recording sheets 12 exists in the sheet supply cassette 40. Therefore the state of FIGS. 12 and 13 can be indicated in a definite manner.

Figure 14:
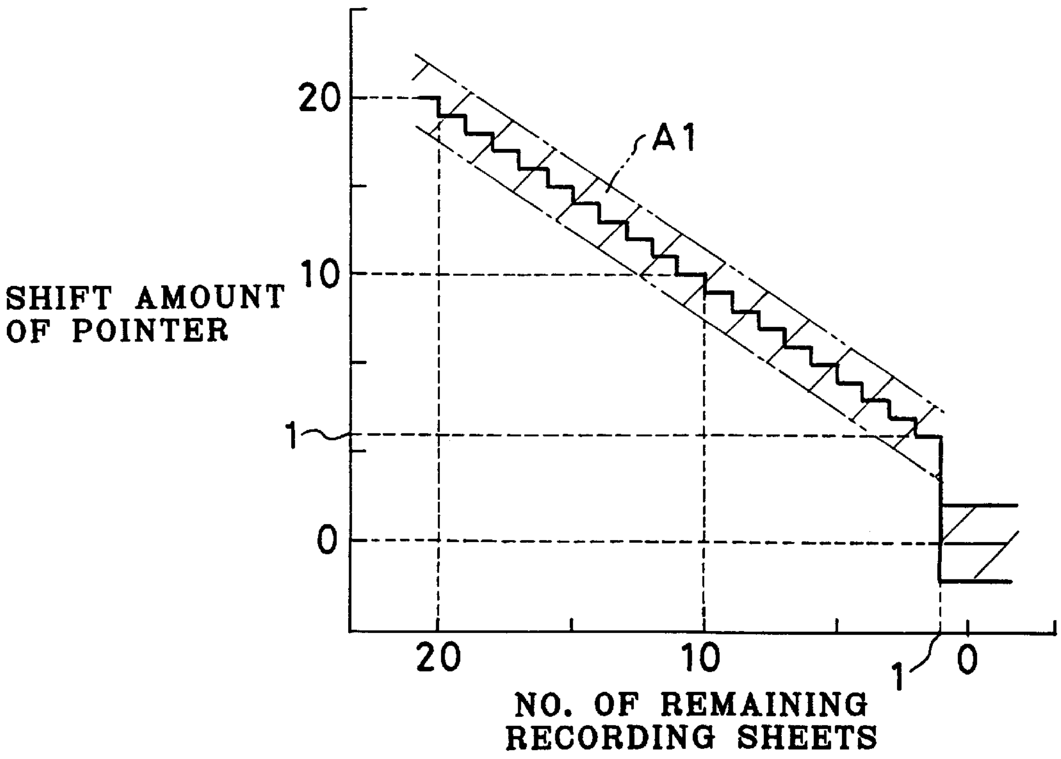
FIG. 14 is a graph illustrating a relationship between the number of remaining recording sheets and a shift amount of a pointer.
Figure 13:
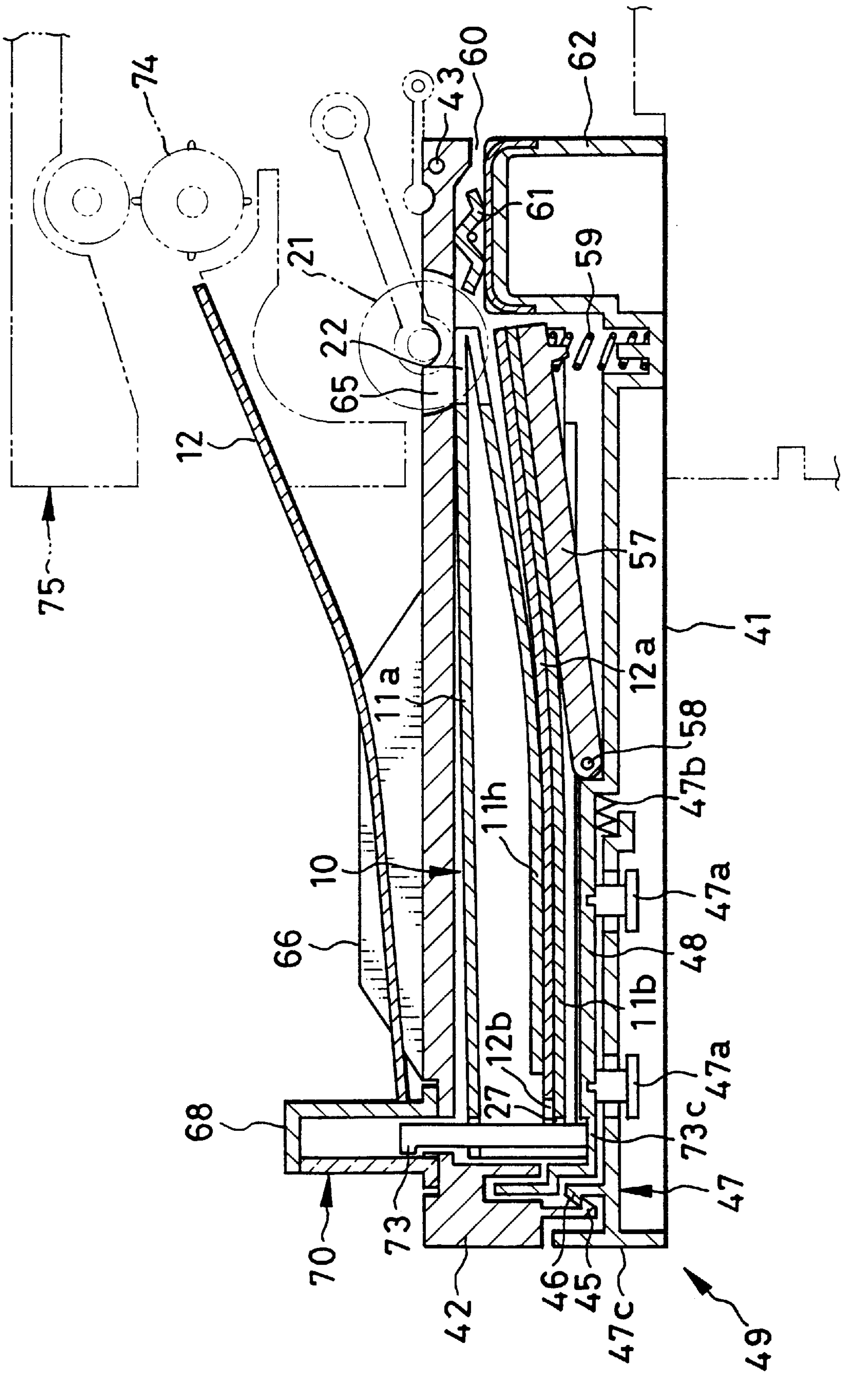
FIG. 13 is an explanatory view in section, illustrating the sheet supply cassette upon the finish of counting of the sheet remainder counter.

FIG. 14 is a graph plotted by taking the remaining amount of the recording sheets 12 in the sheet supply cassette 40 on the vertical axis, and taking the shift of the pusher 73 on the horizontal axis. According to the decrease of the recording sheets 12, the pusher 73 moves down. The remaining amount of the recording sheets 12 and the shift of the pusher 73 are correlated in a linear relationship. If a bend or curve occurs in any of the recording sheets 12, there is an error in the shift indicated by the pusher 73 in an error range A1 hatched in the drawing. When none of the recording sheets 12 exists in the sheet supply cassette 40, the pusher end 73*c* of the pusher 73 contacts the bottom plate 48 of the sheet supply cassette 40 as illustrated in FIGS. 12 and 13. A changing amount abruptly increases after the linear changes. It is thus possible to detect the remaining amount of zero (0) even if a bend or curve occurs in the recording sheets 12.

Figure 15:
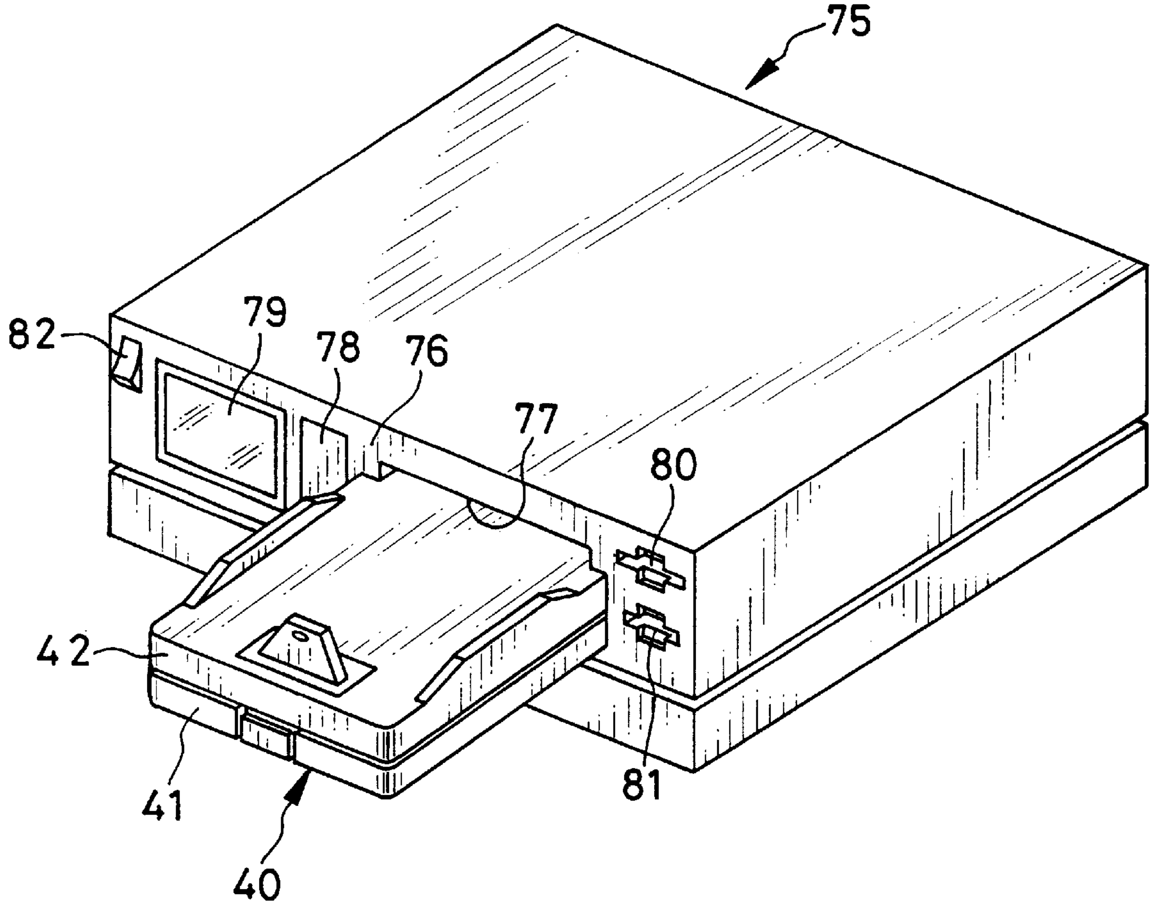
FIG. 15 is a perspective illustrating the thermal printer loaded with the sheet supply cassette.

In FIG. 15, the thermal printer 75 with the sheet supply cassette 40 is illustrated. A front face 76 of the thermal printer 75 has a cassette loading port 77, into which the sheet supply cassette 40 is inserted. In FIG. 10, portions of the supply roller 21 in the cassette loading port 77 enter the roller openings 65 in the lid 42 when the sheet supply cassette 40 is set in the cassette loading port 77. As the recording sheets 12 in the sheet supply cassette 40 are kept pushed up by the lifter plate 57, the uppermost one of the recording sheets 12 contacts the supply roller 21.

The front face 76 has the cassette loading port 77 with an operation panel 78, an information indicator panel 79 of a liquid crystal display (LCD), an IC card insertion port 80, a smart media insertion port 81 and a power switch 82. When a sheet-supply/correction mode is designated by operating the operation panel 78, the information indicator panel 79 is changed over to indicate a menu for inputting correction information. According to this menu, information correction can be entered stepwise at three-color correction keys of yellow (Y), magenta (M) and cyan (C). For example, let the temperature be 15–25° C. Let the humidity be 60%RH. The correction information sheet 32 is observed to obtain a set of the correction information including yellow correction information of "−1", magenta correction information of "−1" and cyan correction information of "0". The correction information is input by operating the operation panel 78, and is stored in a memory in a correcting circuit (not shown). At the time of printing, image data is corrected according to the correction information. To be precise, image correction data is read by referring to the stepwise correction information of "1", "2" and the like, and added to or subtracted from the image data, so as to correct the image data.

When the operation panel 78 is operated to enter printing instructions, an image to be printed is displayed in the information indicator panel 79. After checking the displayed image, a printing key in the operation panel 78 is operated to start printing.

For the printing, the supply roller 21 is rotated in the supply direction at first. The uppermost one of the recording sheets 12 is advanced and supplied into the thermal printer 75. A thermal head is driven to print an image to the one of the recording sheets 12 in the three-color frame-sequential recording. The image is recorded one line after another. The thermal head is driven for each pixel to be recorded in synchronism with the conveyance of the one of the recording sheets 12. Also an ultraviolet lamp is driven upon the thermal recording for the color having been recorded. Thus the image of this color is fixed, not to develop color further in the following steps of the recording.

If the correction information is input in the sheet-supply/correction mode, then image data is corrected according to the correction information. Then an image is printed. The printing density can be prevented from changing even with a change in the temperature. After the three-color frame-sequential recording, the one of the recording sheets 12 in FIG. 10 is ejected by an ejector roller 74 to the lid 42 of the sheet supply cassette 40, to finish the printing operation.

To load the sheet supply cassette 40 with the recording sheet package 10, at first the sheet supply cassette 40 is removed from the cassette loading port 77 in the thermal printer 75. In FIG. 8, the lid 42 is opened. If the packaging body 11 emptied after the previous use remains in the sheet supply cassette 40, the packaging body 11 is removed before the recording sheet package 10 is inserted. The cutouts 23–27 in the packaging body 11 are positioned at each of the loading guiding projections 50–54 of the inner surface 44. Therefore the recording sheet package 10 is correctly set on the inner surface 44. The loading guiding projections 50–54 also operate to neaten the end of the recording sheets 12, which are automatically positioned in the supply station.

If the recording sheet package 10 is erroneously oriented to be set on the inner surface 44, for example if a left lateral side of the recording sheet package 10 is oriented to the right, or its front edge is oriented to the rear, then at least one of the loading guiding projections 50–54 is not received in the cutouts 23–27 but interferes with the periphery of the recording sheet package 10. Thus the recording sheet package 10 can be set in a correct orientation on the inner surface 44. No wasteful recording operation occurs. Recording heat is prevented from being applied to the back surface of the recording sheet 12. The heating element array of the thermal head would be damaged if they should heat the back surface of the recording sheet 12. But the heating element array are protected from being damaged in accordance with the present invention.

If the recording sheets 12 are replaced with thermal printing stickers having the greater thickness, the recording sheet package is replaced. If the recording sheet package 10 is removed, the recording sheet package 10 is inserted into the outer packaging bag 13 of FIG. 4. The fastener 15 is closed to preserve the recording sheet package 10 in a moisture-shielded and light-shielded state. In the course of reuse of the recording sheet package 10, the temperature table 33 and the humidity table 34 are referred to for obtaining an associated set of the correction information 38 from the correction information table 35. The obtained set of the correction information 38 is input by operating the operation panel 78.

The remainder of the recording sheets 12 in the sheet supply cassette 40 can be recognized easily, because the remaining number of sheets is indicated by the sheet remainder counter 70. If the type of the recording sheets 12 is changed from the standard type to the thermal printing sticker type with the greater thickness, the graduation indicia train 72 for the thermal printing sticker type can be referred to for checking the remainder of the recording sheets 12.

Figure 16:
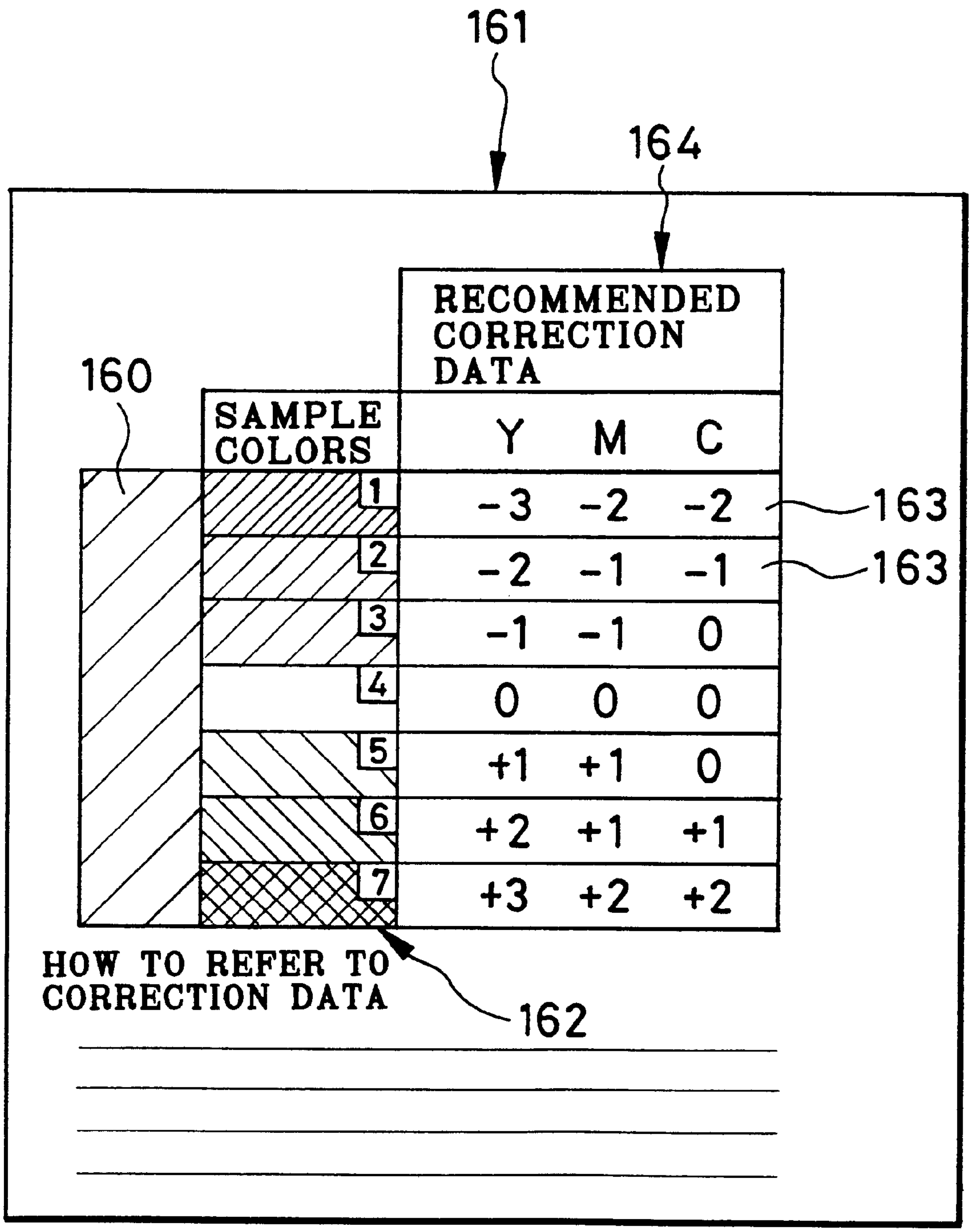
FIG. 16 is an explanatory view in plan, illustrating another preferred correction information sheet provided with a sample recording sheet.

In FIG. 16, a correction information sheet or card 161 is illustrated, in which a sample recording sheet 160 is attached instead of the temperature table 33 and the humidity table 34. The recording sheets 12 change in the coloring characteristic upon a change in the temperature or humidity at which the recording sheets 12 have been preserved. Also the color of the recording surface is changed with time in any preserving condition. Therefore plural sets, for example seven sets of color sample information 162 are predetermined as seven different states of the recording surface changed with time. Seven sets of correction information 163 are prerecorded in a correction information table 164 in association with the colors of the color sample information 162, to constitute the correction information sheet 161. The correction information 163 is predetermined experimentally for each of printer types.

Accordingly the change in the coloring characteristic of the recording sheets 12 due to lapse of time can be compensated for, as the correction information 163 associated with the color sample information 162 can be used if one of the colors in the color sample information 162 is near to that of the sample recording sheet 160. In the example as depicted, the sample recording sheet 160 is found the same as the third set of the color sample information 162. Then the set of the correction information is selected, including yellow correction information of "−1", magenta correction information of "−1" and cyan correction information of "0".

Note that the packaging body for use with the correction information sheet 161 of FIG. 16 has the loading engaging cutouts 23–26 and the detection cutout 27 of FIG. 1, but may lack any of the loading engaging cutouts 23–26 and the detection cutout 27 in the present embodiment.

In the embodiment of FIG. 6, the temperature table 33 and the humidity table 34 are disposed to form a matrix where the correction information is arranged and indicated. Alternatively the correction information may be indicated only by use of the humidity table 34 without the temperature table 33. Furthermore the correction information may be indicated only by use of the temperature table 33 without the humidity table 34.

Figure 17:
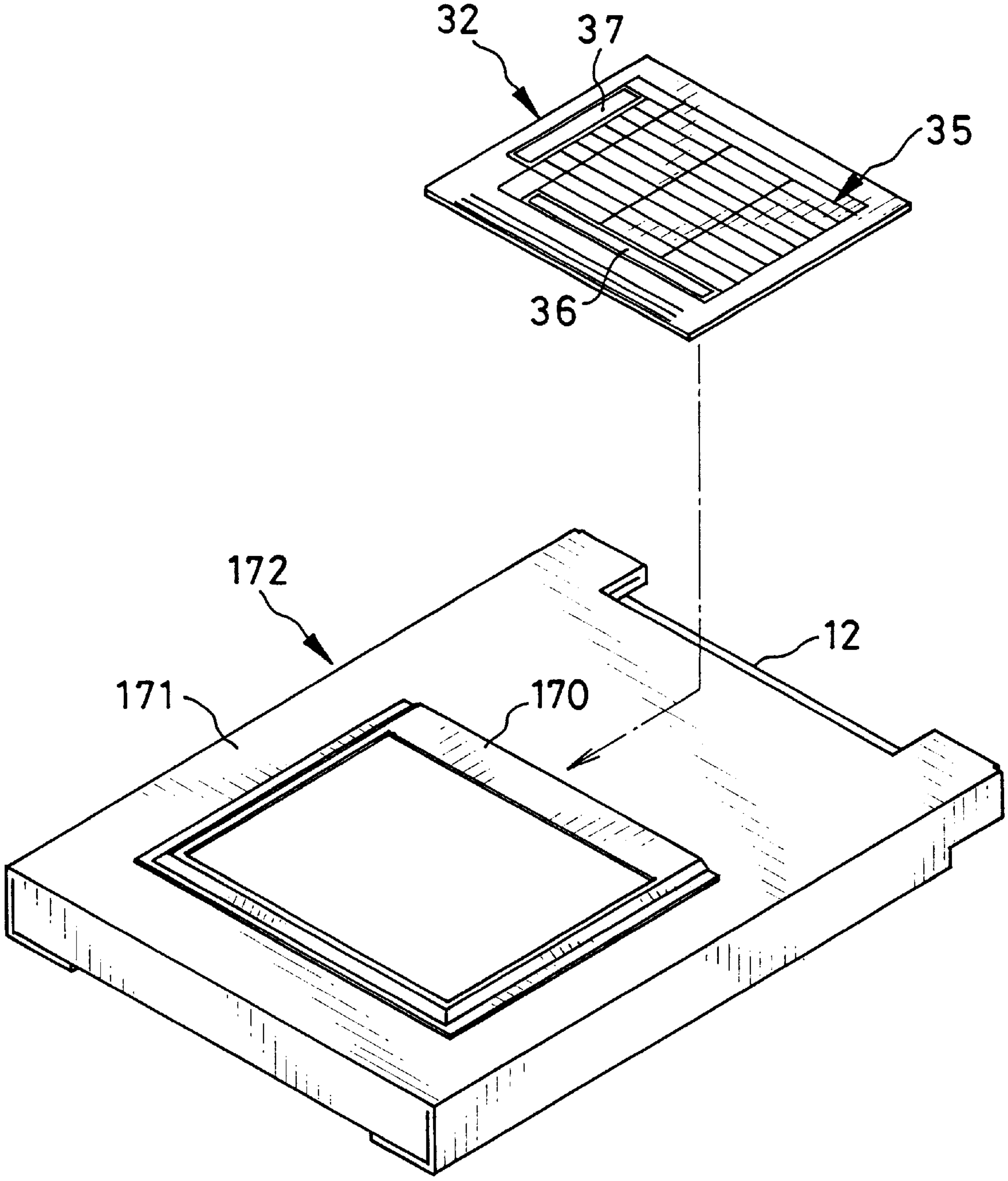
FIG. 17 is a perspective illustrating another preferred recording sheet package on which the correction information sheet is removably mounted.

In the above embodiments, the correction information sheet 32 is attached to the outside of the packaging body 11 as illustrated in FIG. 1. Alternatively a recording sheet package 172 can be constructed as illustrated in FIG. 17, in which the correction information sheet 32 is removably held in a card case 170 attached to a packaging body 171. Furthermore a back surface of the correction information sheet 32 may be provided with an adhesive layer, with which the correction information sheet 32 may be a sticker peelable from and reattachable to the packaging body. Of course the card case 170 is not required. It is also possible to keep the correction information sheet 32 only preserved with the packaging body 11 without fixation.

Furthermore that the correction information sheet 32 can constitute a portion of the packaging body 11. Namely a correction information chart can be printed on the outside of the packaging body 11. Of course the temperature indicator portion 36 and the humidity indicator portion 37 may be prepared separately as small paper, and may be attached in positions of the correction information chart.

Note that the temperature indicator portion 36 and the humidity indicator portion 37, although changed in the color in the above embodiment, may be changed in any state that is externally visible. The temperature indicator portion 36 may be a small type of thermometer. The humidity indicator portion 37 may be a small type of hygrometer.

Note that the correction information sheet 161 in FIG. 16 can be constructed without the sample recording sheet 160. With such a form of the correction information sheet 161, the sample recording sheet 160 may be attached to the outside of the packaging body. At the time of the correction, the color sample information 162 of the correction information sheet 161 is manually placed with the sample recording sheet 160, and compared to it, so as to find out one of the sets of the color sample information 162 the same as the sample recording sheet 160. It is possible to obtain a set of the correction information according to the associated set of the color sample information 162.

Figure 18:
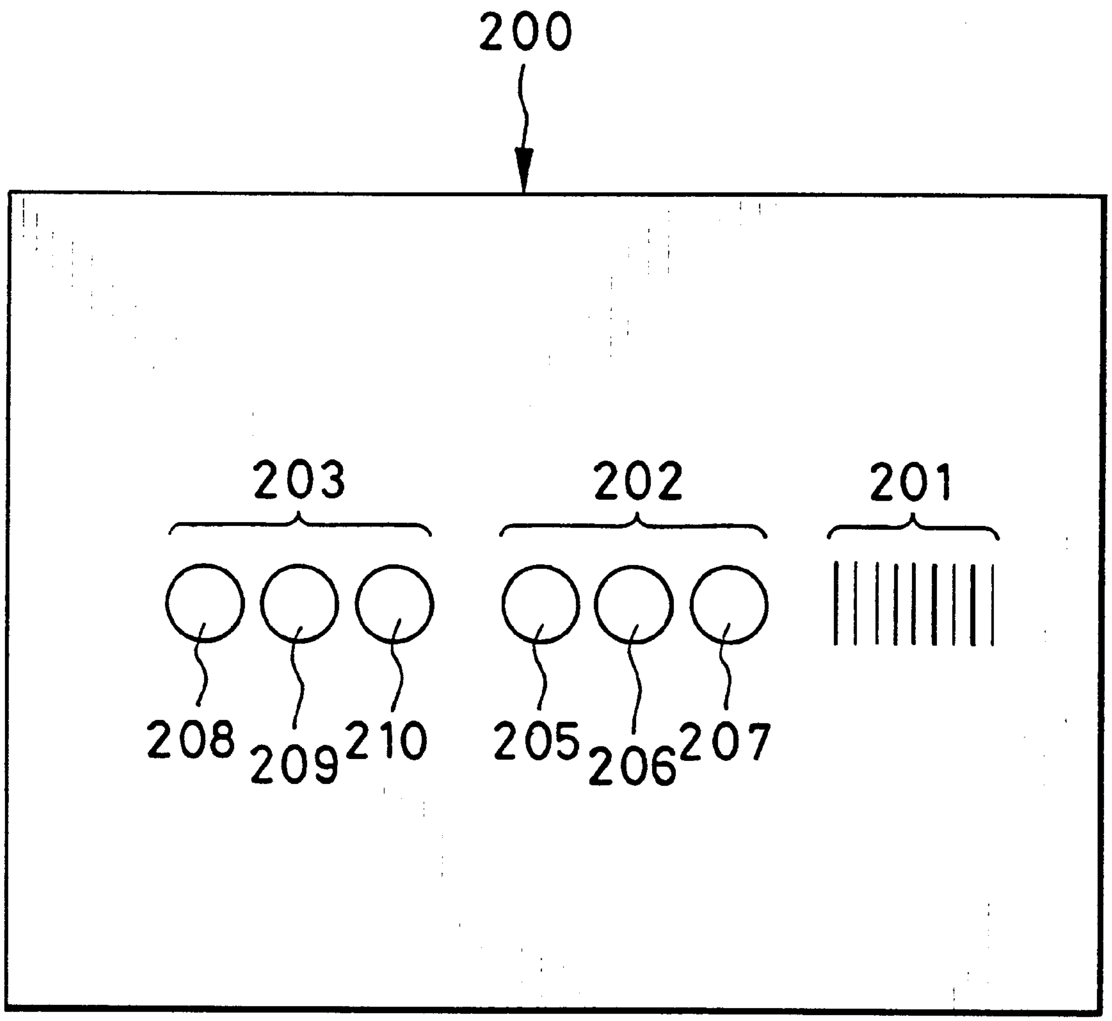
FIG. 18 is an explanatory view in plan, illustrating another preferred recording sheet provided with irreversibly colorable portions for indicating temperature and humidity.

In the above embodiment, a user observes the correction information sheet 161 to recognize the correction information, and manually inputs it. Alternatively the thermal printer may have a construction to detect a preserving condition indicator, and may automatically make the correction. In FIG. 18, a thermosensitive recording sheet 200 for such a construction is depicted. A back surface of the recording sheet 200 is provided with a bar code 201 of expiration date information, a temperature indicator pattern 202 and a humidity indicator pattern 203. The expiration date bar code 201 represents information of an expiration date of the recording sheet 200 before which the recording sheet 200 should be used.

The temperature indicator pattern 202 is constituted by first, second and third temperature indicator portions 205, 206 and 207, each of which is circular. The first temperature indicator portion 205 develops color or becomes visibilized irreversibly when heated at 40° C. The second temperature indicator portion 206 develops color irreversibly when heated at 60° C. The third temperature indicator portion 207 develops color irreversibly when heated at 80° C. The humidity indicator pattern 203 is constituted by first, second and third humidity indicator portions 208, 209 and 210, which are circular. The humidity indicator portions 208, 209 and 210 develop color or become visibilized irreversibly when subjected to a change in the humidity to respectively 60, 40 and 20%RH.

In FIG. 9, an information reader 211 consists of a sensor of a reflection type, and disposed in the thermal printer 75 for detecting the expiration date bar code 201, and the temperature indicator pattern 202 and the humidity indicator pattern 203. The information reader 211 is disposed between the sheet supply cassette 40 and the thermal head, and reads the expiration date bar code 201, and the temperature indicator pattern 202 and the humidity indicator pattern 203 before the thermal recording. Data read by the information reader 211 is sent to a printing controller 212 or system controller, in which the data is used for printing operation.

Figure 19:
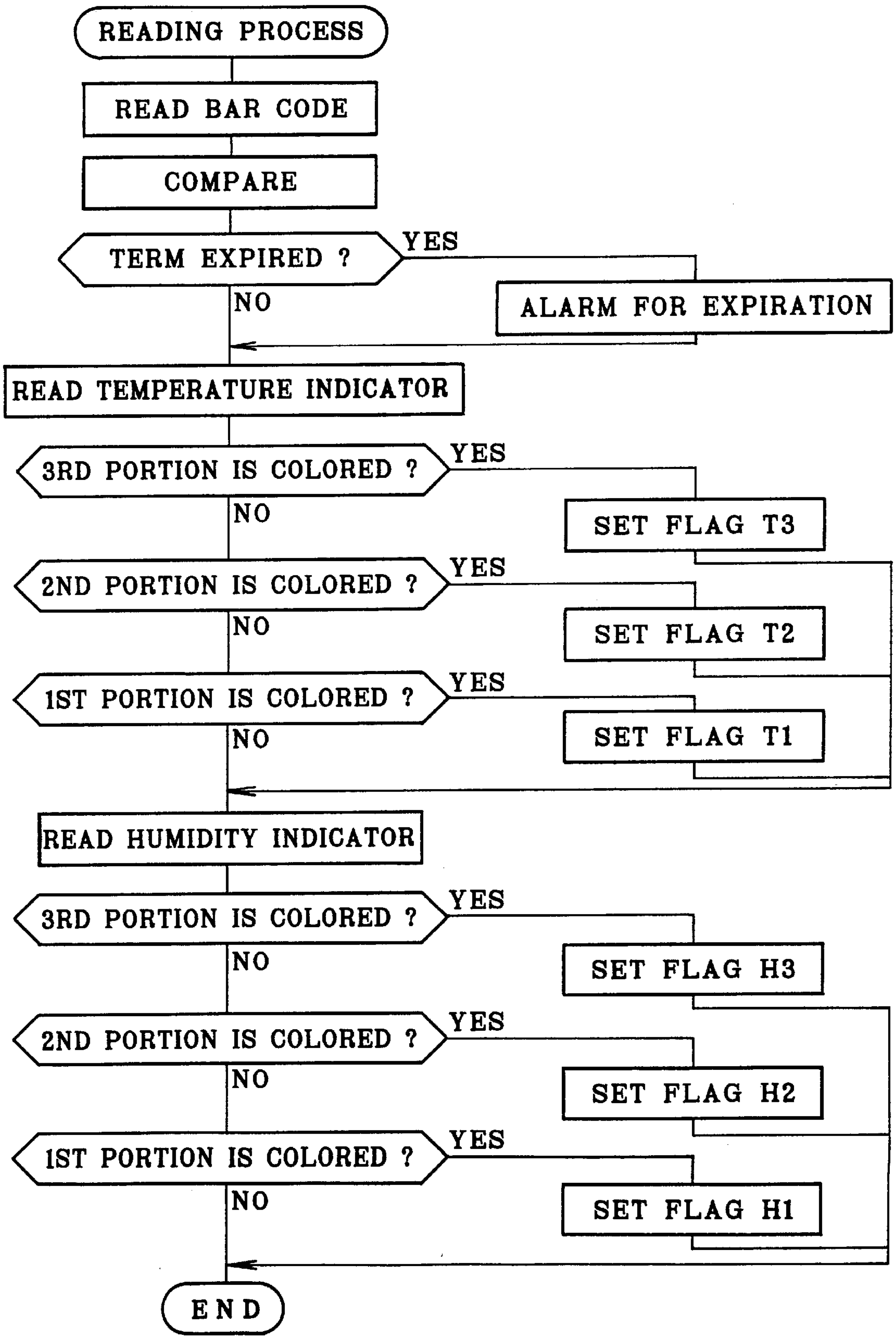
FIG. 19 is a flow chart illustrating a reading process for use with the recording sheet of FIG. 18.
Figure 20:
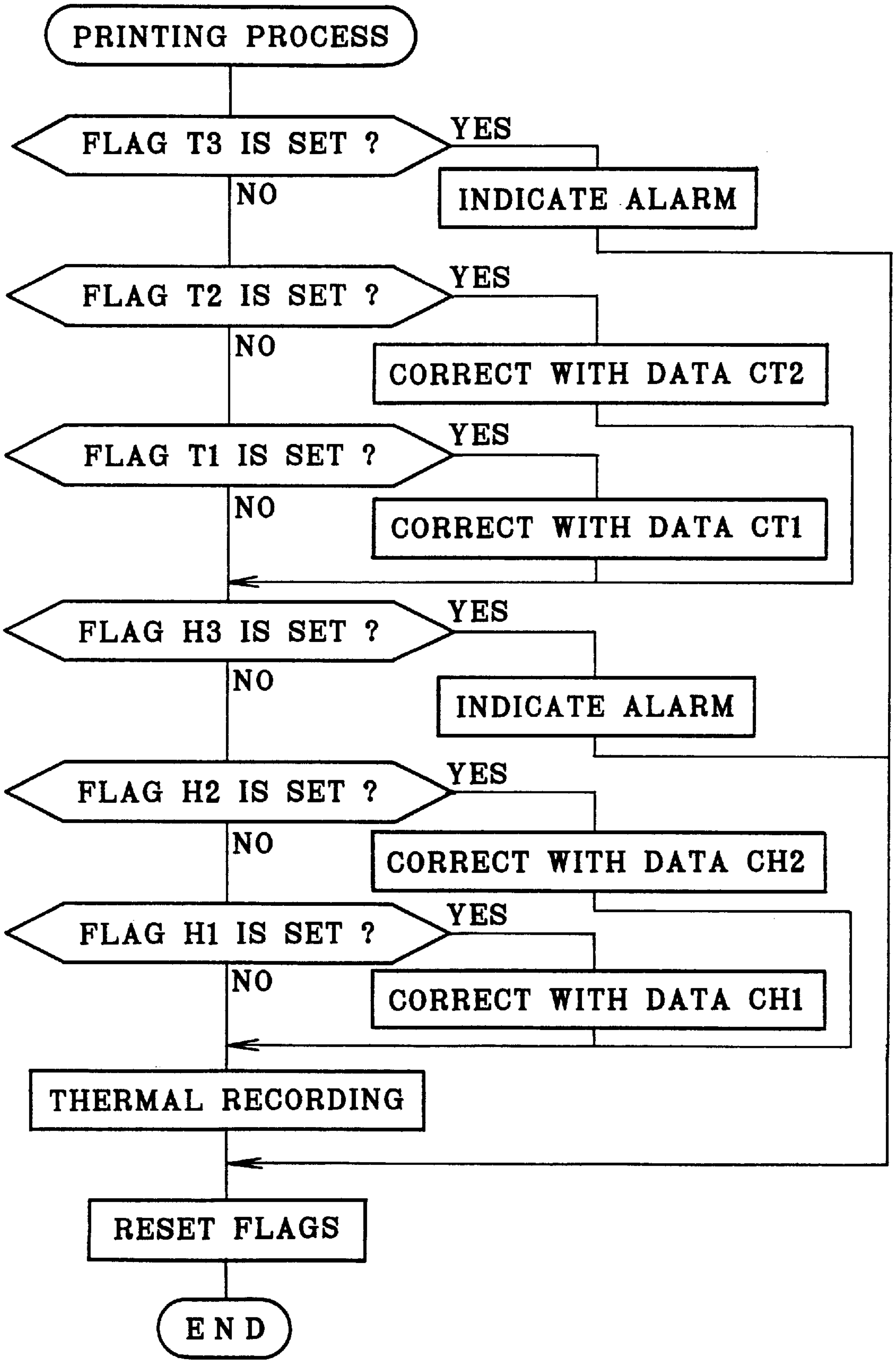
FIG. 20 is a flow chart illustrating a printing process effected with the reading process of FIG. 19.

In FIGS. 19 and 20, a flow chart of a reading process in the printing controller 212 is depicted. At first the information reader 211 reads an expiration date bar code 201 which represents information of an expiration date of the recording sheet 200. The printing controller 212 compares the expiration date as read with the present date, which is determined by a clock in the thermal printer. If the present date is later than the expiration date, then an alarm message for expiration is indicated.

Then the information reader 211 reads the temperature indicator pattern 202. If a colored state of the third temperature indicator portion 207 in the temperature indicator pattern 202 is detected, then a flag T3 is set. If a colored state of the second temperature indicator portion 206 is detected, then a flag T2 is set. If a colored state of the first temperature indicator portion 205 is detected, then a flag T1 is set.

Similarly the information reader 211 reads the humidity indicator pattern 203. If a colored state of the third humidity indicator portion 210 in the humidity indicator pattern 203 is detected, then a flag H3 is set. If a colored state of the second humidity indicator portion 209 is detected, then a flag H2 is set. If a colored state of the first humidity indicator portion 208 is detected, then a flag H1 is set.

Then the printing controller 212 determines correction amounts according to detection signals of the temperature and humidity indicator portions 205–210 for the printing operation. At first, if the flag T3 is set, an alarm message of "SHEET IS NO LONGER PRINTABLE" is indicated in the information indicator panel 79, as the recording sheet 200 has been degraded excessively by the temperature of 80° C. or higher. If the flag T2 or T1 is set, then correction information CT2 or CT1 is respectively obtained. The image data is corrected according to the correction information CT2 or CT1, to print an image.

Similarly the data correction for the influence of the humidity is made according to the humidity indicator pattern 203. If the flag H3 is set, an alarm message of "SHEET IS NO LONGER PRINTABLE" is indicated in the information indicator panel 79. If the flag H2 or H1 is set, then the image data is corrected with respectively correction information CH2 or CH1, for the thermal recording operation.

Note that, if the flag T3 or H3 is set, the thermal printer forcibly ejects the degraded one of the recording sheets 200, and becomes ready for operation of printing with next one of the recording sheets 200. Of course it is possible to construct the thermal printer in a manner for a user to eject the degraded recording sheet manually.

If none of the flags T1–T3 and H1–H3 is set, then it is judged that the recording sheet has been preserved safely without being influenced in the quality by any extreme temperature or humidity. Then an image is printed without correcting the image data in relation to the temperature or humidity.

The sets of correction information CT1, CT2, CH1 and CH2, which are respectively associated with the flags T1, T2, H1 and H2, are experimentally predetermined. The density to be printed is corrected by use of the correction information, which is according to a change in the quality of the recording sheet due to the temperature or humidity to which the sheet has been subjected. In the present embodiment, the correcting information is added to or subtracted from the image data to correct the density. Note that it is alternatively possible to correct the density by changing voltage applied to drive the thermal head, or changing a duty ratio of a drive pulse.

In the above embodiment, the correction information CT1, CT2, CH1 and CH2 is obtained separately between the temperature change and the humidity change. However sets of correction information can be predetermined in a table as combinations of values of the temperature and humidity. For example, eight (8) sets of the correction information may be predetermined for possible combinations selected from the flags T1, T2, H1 and H2, which includes T1 only, T1/H1, T1/H2, T2 only, T2/H1, T2/H2, H1 only, and H2 only.

Figure 21:
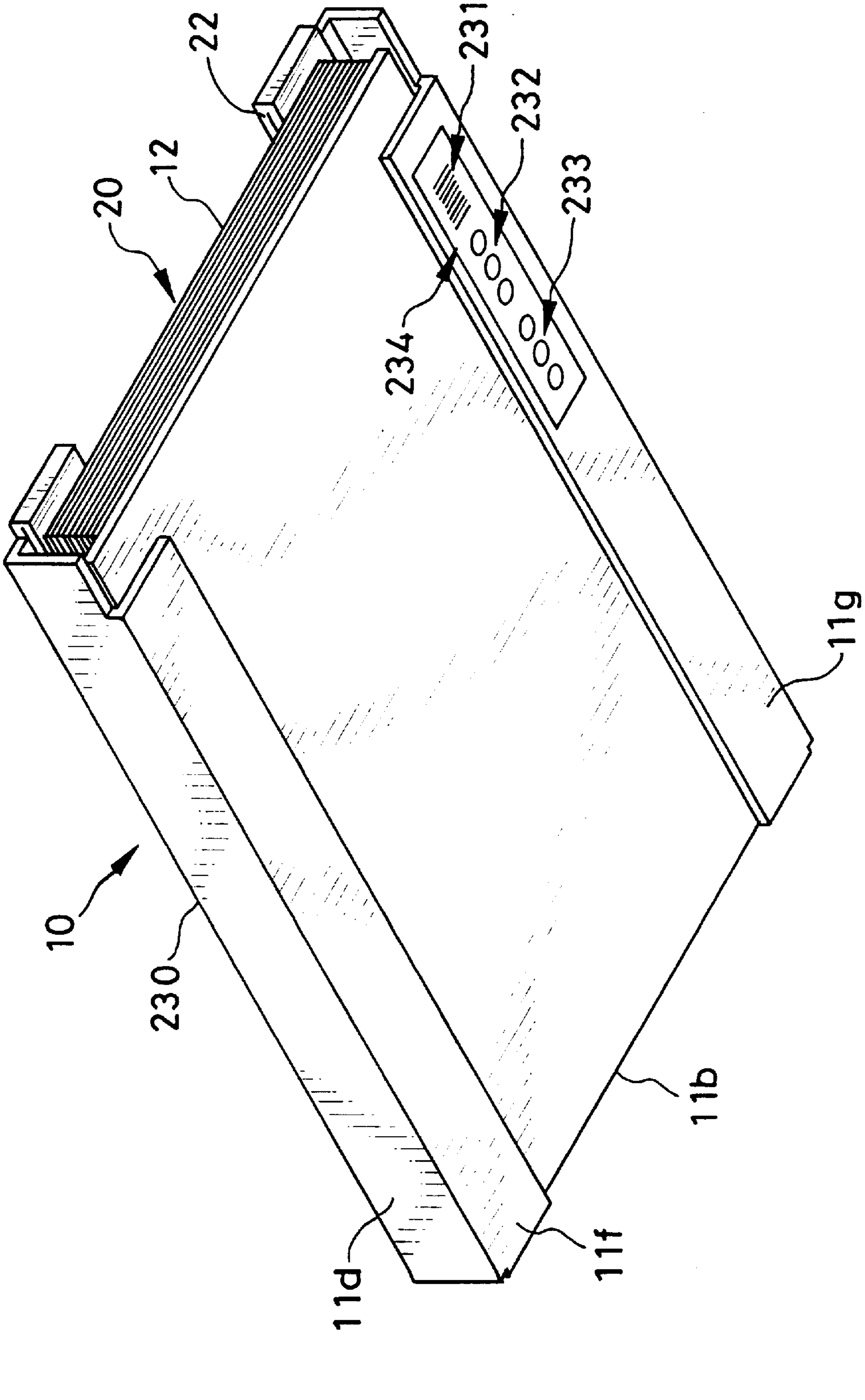
FIG. 21 is a bottom perspective illustrating another preferred recording sheet package provided with irreversibly colorable portions for indicating temperature and humidity.

In the above embodiment, the back surface of the recording sheet 200 has the expiration date bar code 201, the temperature indicator pattern 202 and the humidity indicator pattern 203. Alternatively the expiration date bar code 201, the temperature indicator pattern 202 and the humidity indicator pattern 203 may be prerecorded on a recording surface of the recording sheet 200 in marginal regions outside a recording area. In FIG. 21, another preferred embodiment is illustrated, in which a packaging body 230 is provided with a bar code of expiration date information 231, temperature indicator portions 232 and humidity indicator portions 233. It is possible to recognize the temperature and humidity to which the recording sheets have been subjected commonly in the recording sheet package. This construction is simpler than that in FIG. 18 in which each recording sheet has the expiration date information, temperature indicator portions and humidity indicator portions. Note that a sticker 234 is used, on which the expiration date bar code 231, the temperature indicator portions 232 and the humidity indicator portions 233 are printed. It is possible not to use the sticker 234, but to print the expiration date bar code 231, the temperature indicator portions 232 and the humidity indicator portions 233 directly on the recording sheet package.

Furthermore it is possible to provide recording sheets with a recorded bar code as heat sensitivity correction information, which is determined for each of manufacturing lots for the recording sheets, for the purpose of compensating differences between the manufacturing lots due to the manufacture. Such a sensitivity correction bar code may be substituted for the temperature indicator pattern 202 and the humidity indicator pattern 203, or else may be used additionally to the temperature indicator pattern 202 and the humidity indicator pattern 203.

In the above embodiments, the image data is corrected by inputting the correction information in the sheet-supply/correction mode. If the thermal printer has three-color adjustor dials operable for adjusting the printing density, the image density can be corrected by use of the adjustor dials and by changing voltage applied for driving the thermal head.

In the above embodiments, the sheet remainder counter 70 has the pusher 73 caused by its own weight to push down the uppermost one of the recording sheets 12. It is possible to add a coil spring to bias the pusher 73 downwards, for the purpose of causing the pusher end **73*c* of the pusher 73 to push the uppermost one of the recording sheets. The pusher 73 has a bar shape, but may have any suitable shape such that the pusher 73 can be shifted according to a decrease of the recording sheets. Furthermore a link mechanism or gear mechanism may be associated with the pusher 73 for enlarge the shift of the pusher 73** so as to point one position in a graduation train which can be defined in a comparatively long manner.

In the above embodiments, the transparent plate **68*a* is disposed in front of the pointer ends 73*a* and 73*b*. Alternatively a cutout can be used for protrusion of the pointer ends 73*a* and 73*b* to the outside. With such a cutout, an opaque cover should be disposed in the cutout in a manner movable with the pointer ends 73*a* and 73*b* so as to shield the inside of the sheet supply cassette from ambient light. Furthermore a through hole, which is formed in the lid 42 for causing the pusher 73** to come through, can be provided with a shape shielding ambient light. This is effective in eliminating a transparent plate or an extra light-shielding member. If recording sheets in use are thermal transfer recording sheets or ink-jet recording sheets optically stable and not fixable by electromagnetic rays, no structure as above for shielding light is required.

Figure 22:
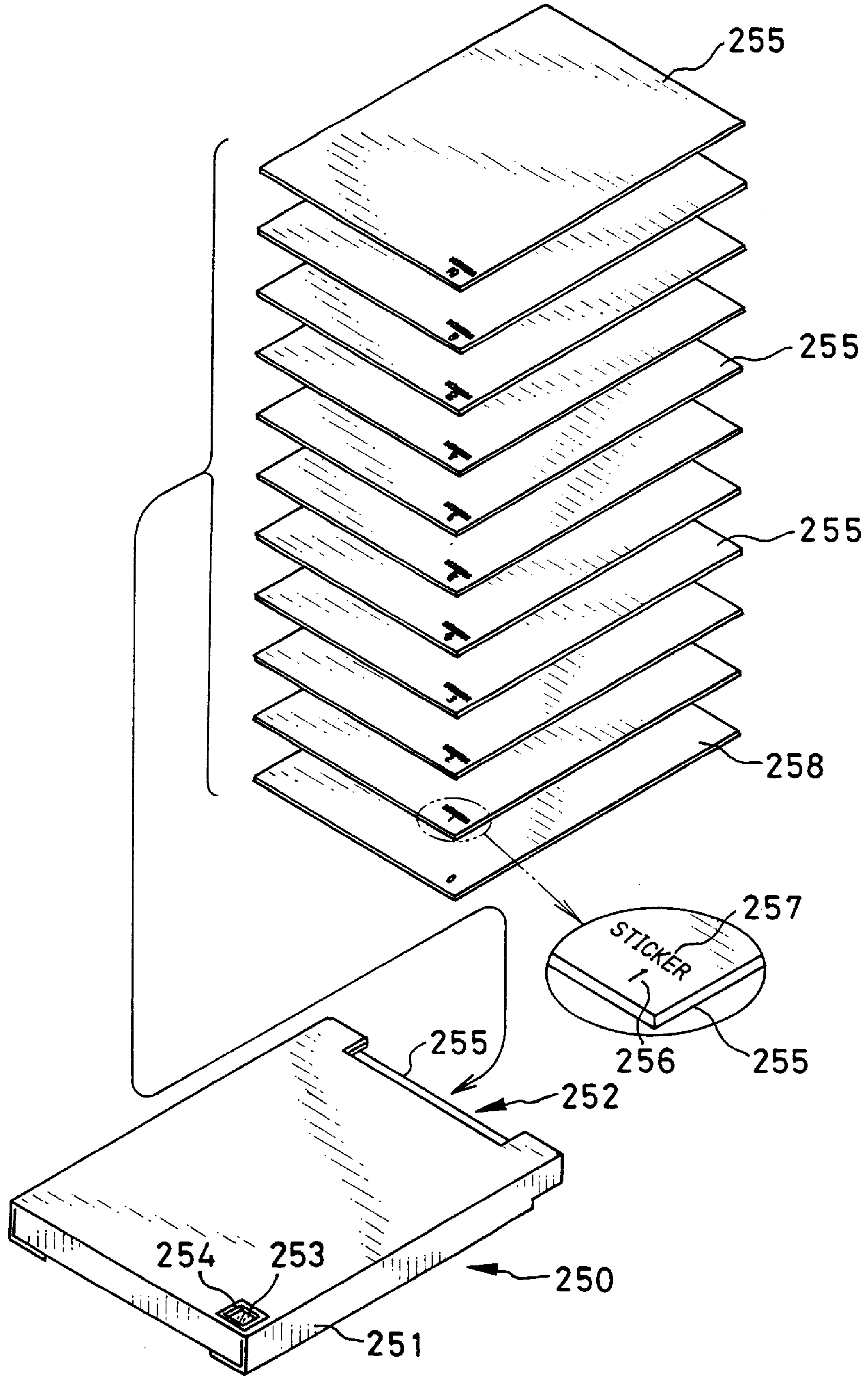
FIG. 22 is an exploded perspective illustrating another preferred recording sheet package in which recording sheets are numbered.

In FIG. 22, a recording sheet package 250 is illustrated, in which the sheet remainder counter 70 is not used. A packaging body 251 has an indicator window 253. The indicator window 253 is formed in an end opposite to a supply opening 252 in the packaging body 251. An ultraviolet cut filter 254 is attached to the inside of the indicator window 253. A recording surface of thermosensitive recording sheets 255 is prevented by the ultraviolet cut filter 254 from being influenced by ultraviolet rays.

Figure 23:
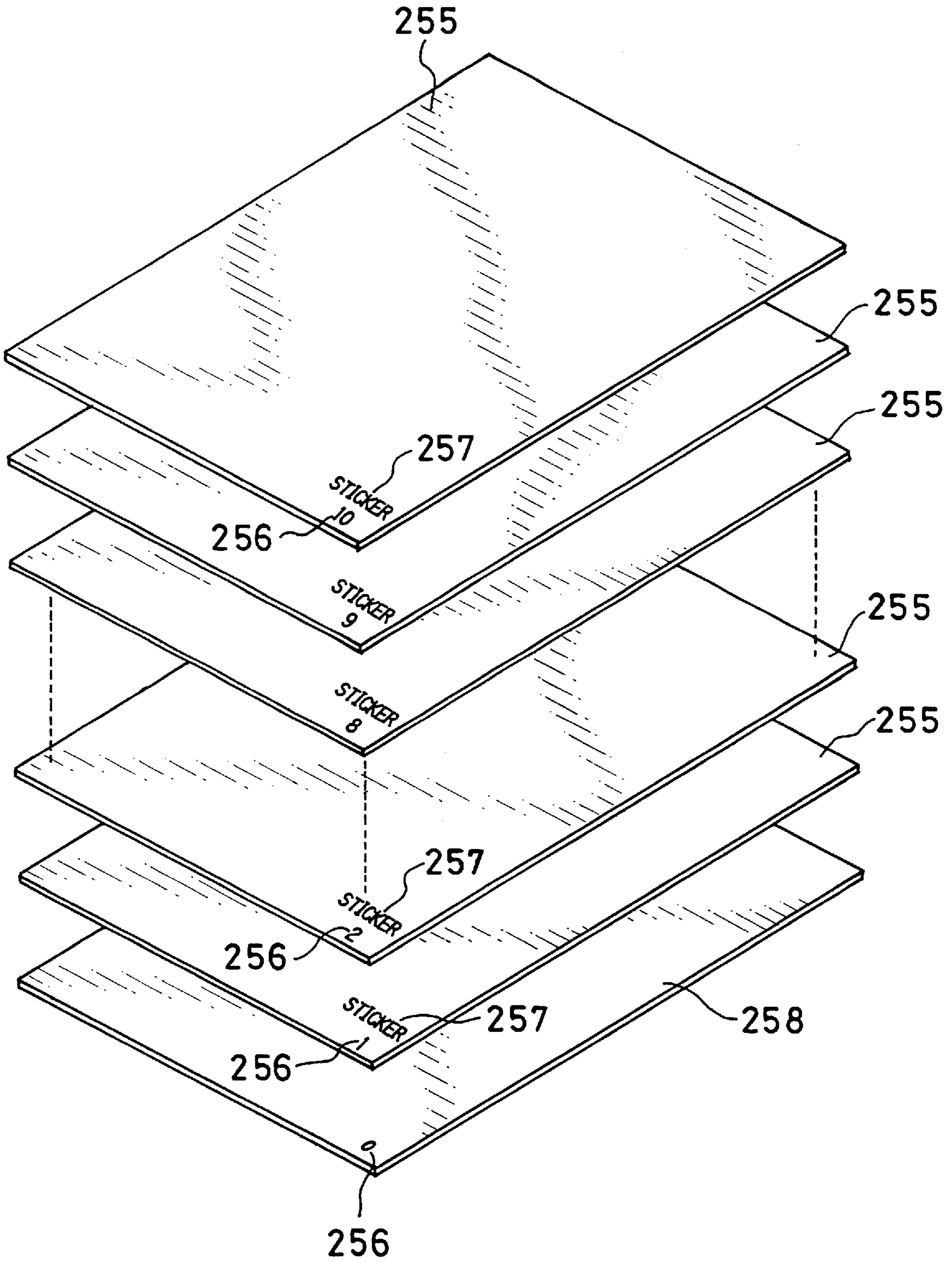
FIG. 23 is an exploded perspective illustrating the recording sheets of FIG. 22.

In a position opposed to the indicator window 253, the recording sheets 255 has number information 256 of 1–N and sheet type information 257. See FIG. 23. As 10 recording sheets 255 are packaged in the present embodiment, N=10, and the uppermost one of the recording sheets 255 has the number information 256 of "10". The remainder of the recording sheets 255 has the number information 256 of "9" down to "1" in the downward sequence. In the present embodiment, a protective sheet 258 is laid under the lowest one of the recording sheets 255. In the position opposed to the indicator window 253, the protective sheet 258 has number information of "0". If a recording sheet package does not contain the protective sheet 258, a bottom plate of the packaging body 251 is provided with number information of "0" in the position opposed to the indicator window 253. Note that the numeral "0" as number information may be replaced with any suitable letter, word, symbol or indicia, such as NONE.

A sheet supply cassette for use with the recording sheet package 250 is provided with a remainder-indicating cassette window disposed in a 11*d* of the sheet supply cassette in a position of the indicator window 253. A user is enabled to check the number of the remaining sheets through the cassette window. Also a transparent sheet is secured to the inside of the cassette window to block entry of external dust. If the recording sheets are optically fixable thermosensitive recording sheets, an ultraviolet cut filter is disposed instead of the transparent sheet. Of course the cassette window can be eliminated from the sheet supply cassette. The user can open the lid of the sheet supply cassette and observe the indicator window 253 of the recording sheet package 250, to recognize the number of the remaining sheets.

In the present invention, the recording sheets to be packaged may be a sublimation type, a wax-transfer type or any of other various types. If the fixation with ultraviolet rays is not required, the ultraviolet cut filter 254 can be eliminated. Instead, a transparent sheet may be disposed in the indicator window. Or nothing may cover the indicator window which may remain open. Furthermore a roll type of a continuous recording sheet may be used in the present invention in which the correction is made in consideration of the present or past condition of the temperature or humidity.

It is also to be noted that the detection cutout 27, although formed to open in the top plate 11*a*, the end plate 11*c* and the bottom plate 11*b* of the packaging body 11, may be formed only in the top plate 11*a* without cutting the end plate 11*c* and the bottom plate 11*b*. Also the detection cutout 27 may be formed only in the end plate 11*c* without cutting the top plate 11*a* and the bottom plate 11*b*. Furthermore the detection cutout 27 may be formed only in the bottom plate 11*b*. With such a form of the detection cutout 27, the pusher 73 of the sheet remainder counter 70 may be constructed to push the recording sheets upwards, not downwards.

Furthermore two detection cutouts can be formed in the packaging body, a first one in the top plate 11*a*, and the second one in the bottom plate 11*b* and directly under the first, the end plate 11*c* remaining without being cut. The pusher 73 of the sheet remainder counter 70, after moving down through the packaging body, can move further toward a position lower than the bottom plate 11*b*.

In the above embodiment, the correction information sheet 32 is a card. Of course the correction information sheet 32 may be a plate, film, sticker or any suitable type of flat material.

In the above embodiment, the temperature indicator pattern 202 and the humidity indicator pattern 203 are colorless or transparent before a reach to each predetermined temperature and humidity. But the temperature indicator pattern 202 and the humidity indicator pattern 203 may have an initial color of sufficiently low density visible to users. The temperature indicator pattern 202 and the humidity indicator pattern 203, upon the reach to each predetermined temperature and humidity, can develop any color of high density, for example black or dark blue.

In the above embodiment, the portions of the humidity indicator pattern 203 may develop the predetermined dark color in response to a rise of the humidity to each of predetermined higher limits. Of course the portions of the humidity indicator pattern 203 may develop the predetermined dark color in response to a drop of the humidity to each of predetermined lower limits.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A correction information sheet for a recording material package, said recording material package including a recording material, and a packaging body for containing said recording material, said correction information sheet comprising:

a temperature indicator portion for detecting a present temperature, and for visibly indicating a selected one of at least first and second predetermined temperature ranges within which said present temperature is; and at least first and second sets of correction information, predetermined in accordance with states of said recording material conditioned by respectively said first and second temperature ranges, indicated externally, and designated selectively in accordance with said first or second temperature range associated with said present temperature.

2. A correction information sheet as defined in claim 1, wherein said temperature indicator portion includes at least first and second regions arranged in sequence, and any one of said at least first and second regions associated with said present temperature changes in a color, for designating first or second temperature range.

3. A correction information sheet as defined in claim 1, said recording material is thermosensitive recording material colorable in response to recording heat energy applied thereto, and said correction information is adapted to correct said recording heat energy.

4. A correction information sheet as defined in claim 1, further comprising a humidity indicator portion for detecting a present humidity, and for visibly indicating a selected one of at least first and second predetermined humidity ranges within which said present humidity is;

wherein said at least first and second sets of said correction information are at least first to fourth sets of said correction information;

said first and second sets of said correction information are predetermined further in accordance with states of said recording material conditioned by said first humidity range, and designated if said present humidity is within said first humidity range;

said third set of said correction information is predetermined in accordance with a state of said recording material conditioned by said first temperature range and said second humidity range, and designated if said present temperature is within said first temperature range and also if said present humidity is within said second humidity range;

said fourth set of said correction information is predetermined in accordance with a state of said recording material conditioned by said second temperature range and said second humidity range, and designated if said present temperature is within said second temperature range and also if said present humidity is within said second humidity range.

5. A correction information sheet as defined in claim 4, wherein said first to fourth sets of said correction information are arranged in a matrix.

6. A recording material package, including a recording material, and a packaging body for containing said recording material, said recording material package comprising:

a correction information chart, disposed outside said packaging body, and including:

(a) a temperature indicator portion for detecting a present temperature, and for visibly indicating a selected one of at least first and second predetermined temperature ranges within which said present temperature is; and (b) at least first and second sets of correction information, predetermined in accordance with states of said recording material conditioned by respectively said first and second temperature ranges, indicated externally, and designated selectively in accordance with said first or second temperature range associated with said present temperature.

7. A recording material package comprising:

a recording material;

a packaging body for containing said recording material;

a sample recording sheet, constituted in a manner of said recording material, and disposed outside said packaging body;

plural sets of color sample information, indicated with said sample recording sheet, for representing colors of said recording material changed with time; and plural sets of correction information, indicated in association with respectively said sets of said color sample information, wherein when said sample recording sheet is in a state of a selected one of said sets of said color sample information, one of said sets of said correction information is designated in association with said selected set of said color sample information.

8. A recording sheet package settable in a printer having a sheet remainder counter, comprising:

a stack of plural recording sheets;

a packaging body for containing said recording sheets;

a detection cutout, formed in said packaging body, for receiving insertion of said sheet remainder counter, so as to allow said sheet remainder counter to push said recording sheets in a thickness direction thereof, in order to detect an amount of remaining ones of said recording sheets in said packaging body; and a correction information chart, disposed outside said packaging body, and including:

(a) a temperature indicator portion for detecting a present temperature, and for visibly indicating a selected one of at least first and second predetermined temperature ranges within which said present temperature is; and (b) at least first and second sets of correction information, predetermined in accordance with states of said recording sheets conditioned by respectively said first and second temperature ranges, indicated externally, and designated selectively in accordance with said first or second temperature range associated with said present temperature.

9. A recording sheet package as defined in claim 8, wherein said recording sheets are thermosensitive recording sheets colorable in response to recording heat energy applied thereto, and said correction information is adapted to correct said recording heat energy.

* * * * *